United States Patent
Agarwal et al.

(10) Patent No.: US 10,616,323 B1
(45) Date of Patent: Apr. 7, 2020

(54) GEO-REPLICATED IOT HUB

(71) Applicant: Microsoft Technology Licensing, LLC, Redmond, WA (US)

(72) Inventors: Kapil Agarwal, Bellevue, WA (US); Vaibhav Sharma, Seattle, WA (US); Affan Arshad Dar, Redmond, WA (US); Roopesh Kumar Manda, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/197,047

(22) Filed: Nov. 20, 2018

(51) Int. Cl.
*H04L 29/08* (2006.01)
*H04L 12/26* (2006.01)

(52) U.S. Cl.
CPC ......... *H04L 67/1051* (2013.01); *H04L 43/04* (2013.01); *H04L 67/1002* (2013.01); *H04L 67/1095* (2013.01); *H04L 67/125* (2013.01); *H04L 67/34* (2013.01)

(58) Field of Classification Search
CPC . H04L 67/1051; H04L 43/04; H04L 67/1002; H04L 67/1095; H04L 67/125; H04L 67/34
See application file for complete search history.

(56) References Cited

U.S. PATENT DOCUMENTS

| 6,292,905 | B1* | 9/2001 | Wallach | G06F 9/4411 |
| | | | | 709/239 |
| 2019/0272280 | A1* | 9/2019 | Nozdrin | G06F 16/273 |
| 2019/0346833 | A1* | 11/2019 | Moorhouse | G06F 16/903 |

OTHER PUBLICATIONS

Lamport, Leslie, "The Part-Time Parliament", ACM Transactions on Computer Systems 16, 2 (May 1998), 133-169. Minor corrections were made on Aug. 29, 2000. (33 pages total).

* cited by examiner

*Primary Examiner* — El Hadji M Sall
(74) *Attorney, Agent, or Firm* — Mark K. Young; Mayer & Williams PC

(57) ABSTRACT

Multiple geo-replicated and independent IoT (Internet of Things) hubs configured as servers with storage capacities are utilized and span across various regions in the world, to each of which IoT devices can connect and transmit telemetry data. The IoT devices, configured with sensors to generate telemetry data (e.g., temperature, pressure, etc.), can fail over to another geo-replicated IoT hub (the "target geo-replicated IoT hub") when one IoT hub experiences technical failures or the IoT device changes location to a region which is covered by the target IoT hub. Upon receiving a connection request from the IoT device, the target geo-replicated IoT hub submits a proposal to available geo-replicated IoT hubs for ownership over the IoT device, that is, receive data from and transmit messages to the IoT device. A quorum is sought so that all IoT hubs are in agreement as to a current owner of the IoT device.

20 Claims, 16 Drawing Sheets

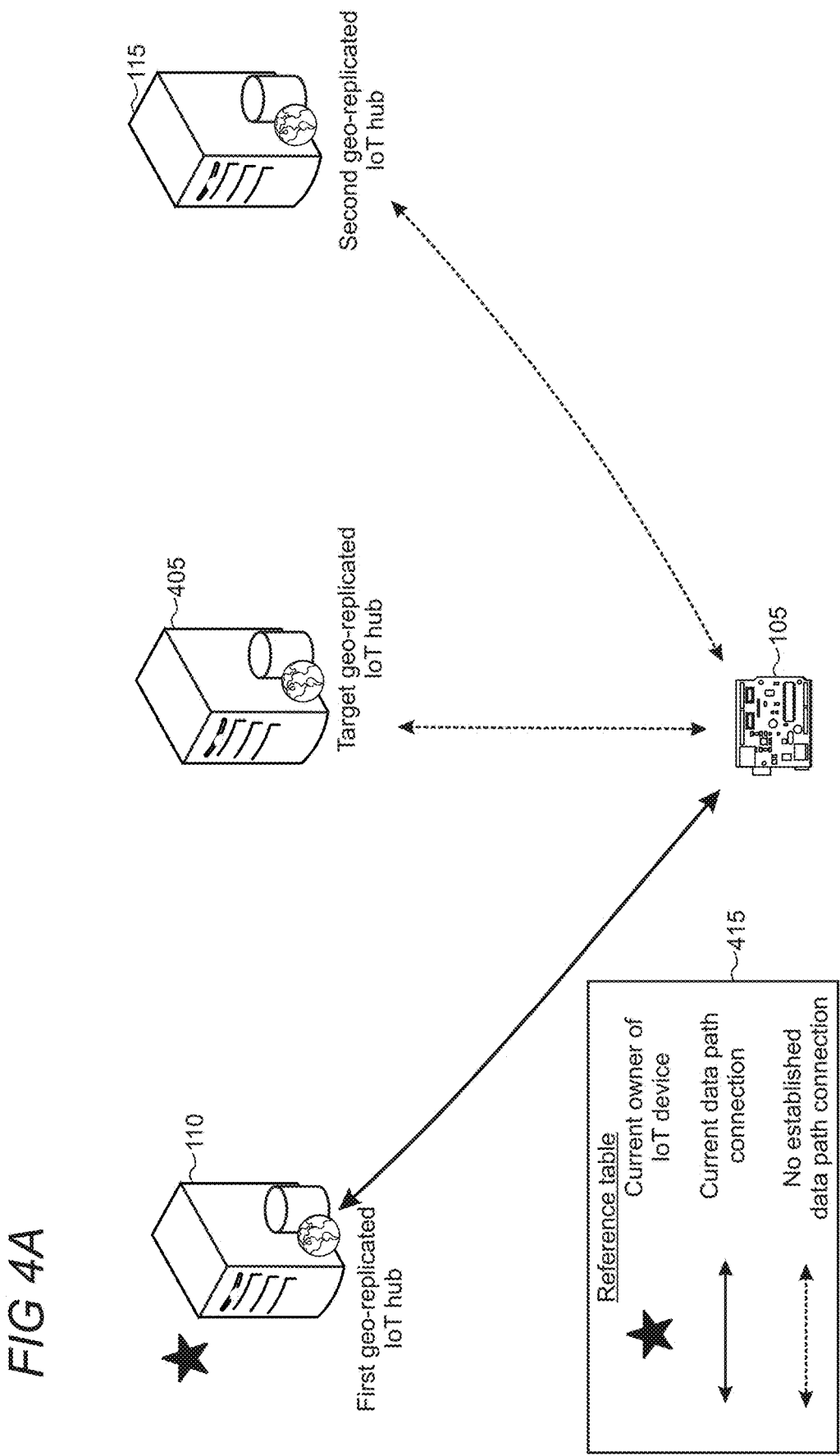

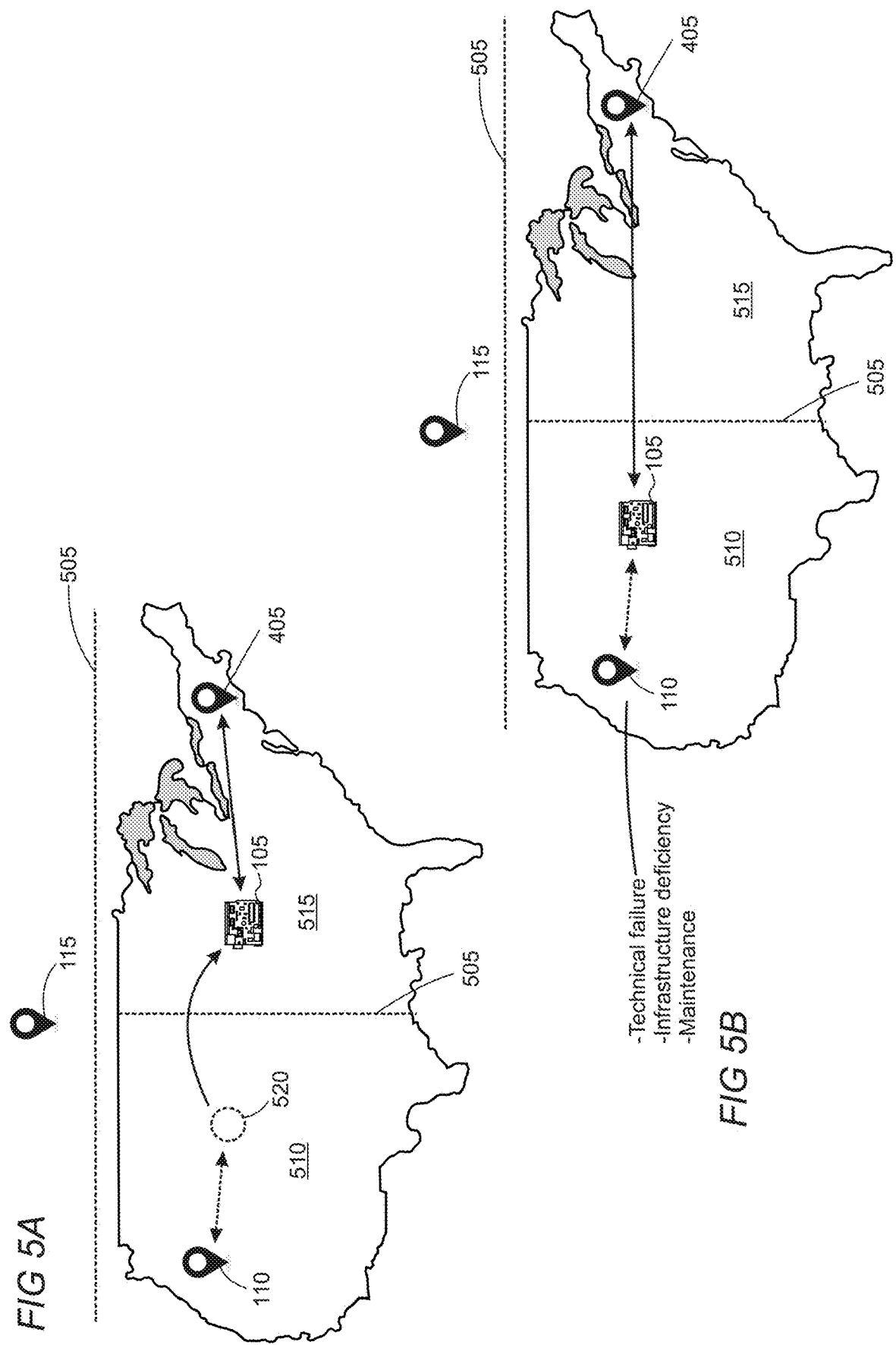

1000

1100

GEO-REPLICATED IOT HUB

BACKGROUND

The Internet of Things (IoT) connects devices of various types, sizes, and functions over a network. The devices (or "things") in the IoT can include a location tag, a connected thermostat, a monitoring camera, a sensor device, industrial machine, or anything that can communicate data over a network connection. IoT devices typically have a way to connect to the Internet to report telemetry data to other devices and/or services and request/receive information from other devices or services.

In some implementations, devices connect to a single IoT hub (e.g., a collection of servers and databases), which can be a single point of operational failure. Customers may build their own fault tolerance systems to protect their data, but this can be expensive, burdensome, and inefficient.

SUMMARY

Multiple replicated, independently-operated, and uncorrelated IoT hubs may be deployed across various geographical regions of an IoT device service area. IoT devices can connect, transmit telemetry data, and switch among such geo-replicated IoT hubs so that failure of one geo-replicated IoT hub cannot be correlated (i.e., connected) to the failure of another. Implementing multiple geo-replicated IoT hubs across an IoT service area enables greater availability of services for IoT devices and, depending on the mode of data synchronization, data consistency and low latency. An IoT device can connect to any one of the IoT hubs that are a part of an availability set of IoT hubs so that customers can seamlessly shift IoT traffic from one geo-replicated IoT hub in one region to other geo-replicated IoT hubs in other regions.

A single geo-replicated IoT hub is said to own an IoT device that is connected to it. It receives D2C (device-to-cloud) messages (e.g., telemetry data) from the IoT device and transmits C2D (cloud-to-device) messages and commands (e.g., start, stop, reset) to the IoT device. The geo-replicated IoT hub is configured to synchronously or asynchronously replicate the telemetry data received from IoT devices to other geo-replicated IoT hubs. Ownership responsibilities over an IoT device may switch from one geo-replicated IoT hub to a target geo-replicated IoT hub in typical scenarios. The target geo-replicated IoT hub refers to an IoT hub assuming ownership over an IoT device, either as an initial connection for the IoT device or taking ownership from a previously used geo-replicated IoT hub. One scenario in which ownership responsibilities can switch is that the IoT device moves to the region covered by the target geo-replicated IoT hub. Another is that the customer may want to use the services offered by the target geo-replicated IoT hub because of diversification of capabilities between the IoT hubs or due to an infrastructure failure. The target geo-replicated IoT hub may receive a connection request from the IoT device to initiate a switch. Before taking over ownership of the IoT device, the target geo-replicated IoT hub attempts to establish a quorum among all available geo-replicated IoT hubs that confirms that the target geo-replicated IoT hub is the new owner and is thus responsible for the requesting IoT device. Using an odd number of geo-replicated IoT hubs avoids quorum stalemate scenarios.

In one illustrative example, three geo-replicated IoT hubs are utilized in total—first and second geo-replicated IoT hubs and the target geo-replicated IoT hub. The target geo-replicated IoT hub proposes an updated version number, or other value, for the IoT device, which is received and utilized by the first and second geo-replicated IoT hubs to verify the new owner. Each geo-replicated IoT hub, including the target geo-replicated IoT hub, may have a synchronized version number for the IoT device to indicate a current owner of the IoT device. The version number is incremented by the target geo-replicated IoT hub upon receiving the connection request from the IoT device. At least one geo-replicated IoT hub verifies that the proposed version number from the target geo-replicated IoT hub is the highest known version number. While either the first or second geo-replicated IoT hubs can respond, if the first geo-replicated IoT hub is experiencing technical failures, then confirmation from the second geo-replicated IoT hub is sufficient since that would provide the needed quorum (i.e., the target and second geo-replicated IoT hubs represent two out of the three geo-replicated IoT hubs in total). The target geo-replicated IoT hub accepts ownership over the IoT device when a quorum is established. C2D and D2C messages are communicated between the IoT device and the target geo-replicated IoT hub.

The latency experienced during data replication among the geo-replicated IoT hubs can be managed to strike a desired balance between constant network connectivity and data consistency. For example, synchronous data replication may provide increased data consistency with lower connectivity performance, while asynchronous data replication may provide relatively decreased data consistency with greater connectivity performance.

When asynchronous data replication is implemented among the geo-replicated IoT hubs, data loss may occur when the IoT device switches IoT hubs. The target geo-replicated IoT hub may determine occurrence of data loss, by checking with the previous geo-replicated IoT hub, and attempt data recovery. Data recovery may be unsuccessful if, for example, the first geo-replicated IoT hub is experiencing technical issues. The target geo-replicated IoT hub may notify the IoT device or a client computing device (e.g., laptop computer, smartphone, personal computer) and seek approval or denial to connect to the IoT device. Approving the connection may result in data loss and denying the connection may result in the IoT device attempting to re-establish itself with the first geo-replicated IoT hub. A user operating the client computing device can approve or deny the connection in response to the notification in some cases. In other cases, an IoT device can be configured to automatically approve or deny a connection, or a third party service, user application, or a policy that is defined by the IoT hubs can be used to determine whether or not to establish the connection despite the data loss.

The utilization of geo-replicated IoT hubs increases opportunities for IoT devices to have constant connectivity while ensuring that data is backed up by equally reliable and independent IoT hubs. IoT devices can switch to other geo-replicated IoT hubs if the IoT device geographically moves, or gracefully fail over to another hub in the event of a failure such as as result of a malicious attack, severe weather, or power outage, etc.

Customers can have the option to balance between data accuracy and network connectivity for IoT devices. For example, certain IoT devices like medical equipment, may transmit data to the cloud relatively infrequently (e.g., once per day). By contrast, constant connectivity may be important, for example, for electronic smart door locks so that users can ingress and egress without delay. The geo-replicated IoT hubs provide increased flexibility to balance data consistency and connectivity to thereby meet customer goals for IoT device deployment and operating costs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 4A shows an illustrative environment in which the IoT device communicates with a first geo-replicated IoT hub which currently owns the IoT device;

FIGS. 5A-B show illustrative environments in which the ownership of the IoT device is switched to a target geo-replicated IoT hub;

Like reference numerals indicate like elements in the drawings. Elements are not drawn to scale unless otherwise indicated.

DETAILED DESCRIPTION

Figure 1:
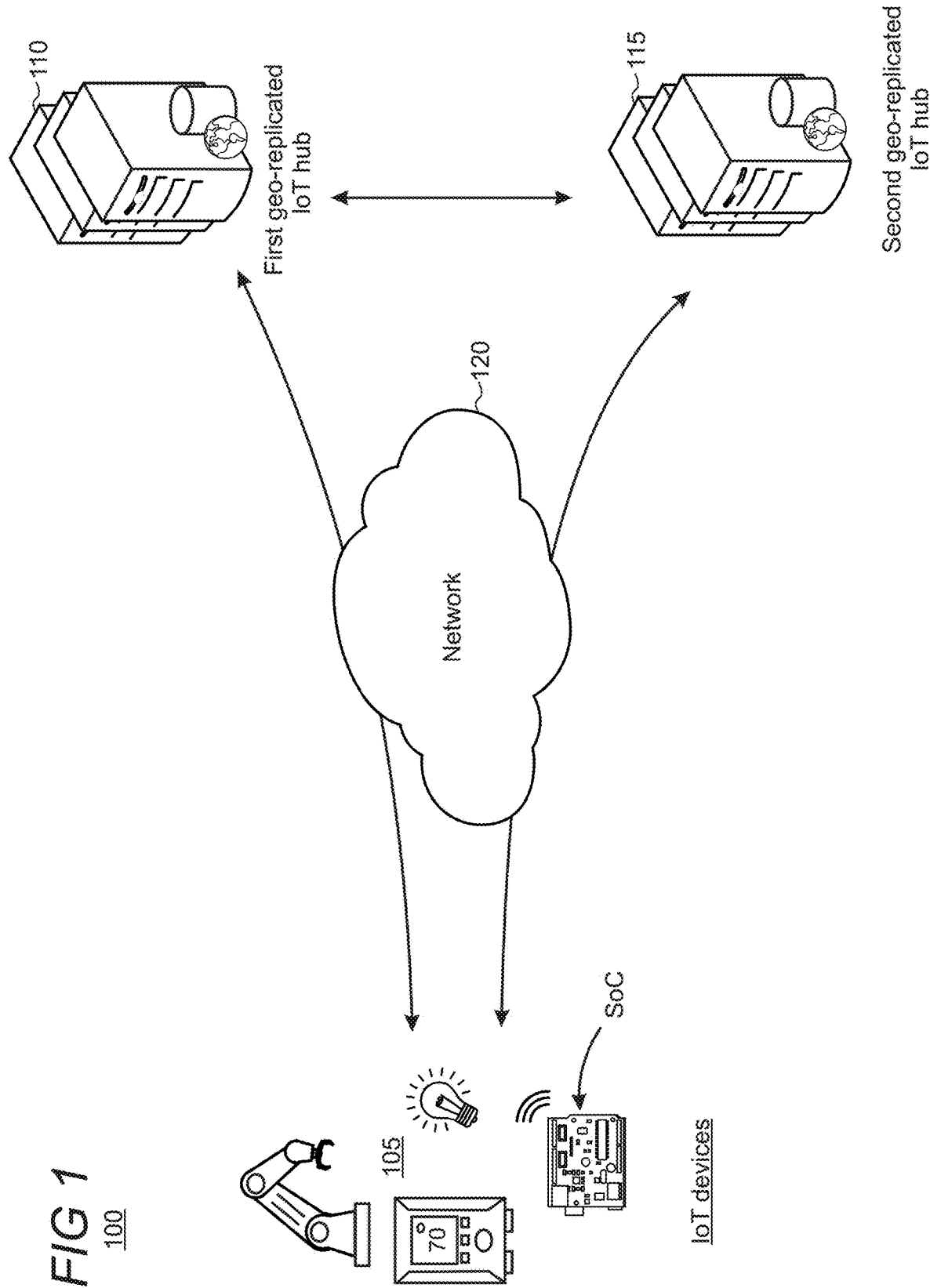
FIG. 1 shows an illustrative environment of Internet of Things (IoT) devices communicating with geo-replicated IoT hubs over a network.

FIG. 1 shows an illustrative environment 100 in which a number of Internet of Things (IoT) devices 105 are configured to communicate over a network 120 with a first geo-replicated IoT hub 110 and second geo-replicated IoT hub 115, which can respectively include one or more remote servers and databases for data storage. The network can be comprised of routers, switches, and the like and includes, for example, personal area networks, local area networks, wide area networks, the Internet, and the world wide web.

IoT devices may interconnect and/or communicate over various networks, and typically utilize one or more sensors to gather pertinent data useful to particular devices and for a particular reason. IoT devices can utilize various sensors, actuators, software, network connectivity, and connections to the remote servers to thereby facilitate and establish comprehensive knowledge, understanding, or insight into a component or its environment. As illustratively shown in FIG. 1, exemplary IoT devices 105 can include commercial machinery like a crane, or household items such as a light bulb, thermostat, and the like. However, these devices are only illustrative as the number, variety, and/or type of objects or components which can be configured as an IoT device are virtually unlimited. An exemplary motherboard which may include a System on a Chip (SoC) configuration is also illustratively shown that can implement an IoT device or enable transition of a device, component, or object into an IoT-configured device.

Figure 2:
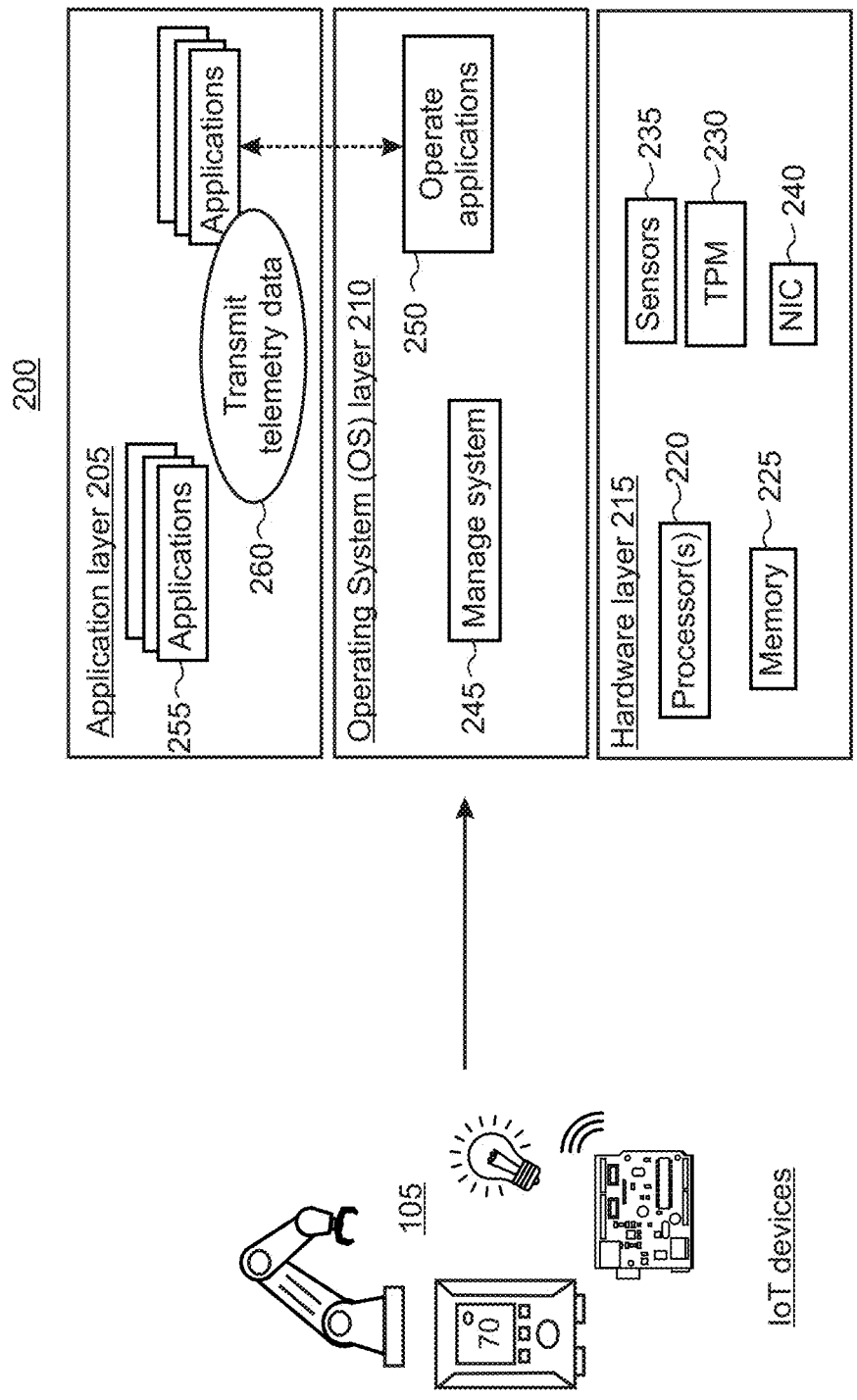
FIG. 2 shows an illustrative architecture of an IoT device.

FIG. 2 shows an illustrative system architecture 200 for an IoT device 105. The architecture is arranged in layers and includes a hardware layer 215, an operating system (OS) layer 210, and an application layer 205. The hardware layer 215 provides an abstraction of the various hardware used by the IoT device 105 to the layers above it. In this illustrative example, the hardware layer supports one or more processors 220, memory 225, a trusted platform module (TPM) 230, sensors 235 (e.g., temperature sensors, pressure sensors, motion sensors), a network interface card (NIC) 240, and input/output devices or user interfaces such as buttons, displays, etc. (not shown). The TPM may be implemented using a specialized hardware chip that is configured to provide hardware authentication for the IoT device 105. The TPM is utilized to increase device integrity and security by enabling verification that the IoT device performs as intended. The NIC can include a radio or transceiver to communicate wirelessly over Wi-Fi using, for example, a router or access point.

The application layer 205, in this illustrative example, supports various applications 255. Although not shown, the applications can be configured to receive data gathered from one or more sensors, make sense of that data for use, and transmit derived telemetry data 260 to a remote service such as the first or second geo-replicated IoT hubs 110, 115 (FIG. 1). The geo-replicated IoT hubs can use the data for various purposes and/or provide services or expose resources to the device. For example, the geo-replicated IoT hub can store received telemetry data from a plurality of IoT devices and provide data replication services across other geo-replicated IoT hubs. Exemplary services provided by, for example, an IoT hub can include predictive analyses so that system administrators or other users can be proactive to potential problems instead of being reactive. Thus, sensors on a crane can gather data which may indicate a problem with the crane's operations, for example, and an administrator can investigate the potential problem instead of waiting for the problem to occur downstream in the process, assembly, etc.

Any number of applications can be utilized by the respective IoT device, whether proprietary or third-party applications. The applications can be implemented using locally executing code. However, in some cases, applications can rely on services and/or remote code execution provided by remote servers or other computing platforms such as those supported by the IoT hubs 110, 115.

The OS layer 210 supports, among other operations, managing the operating system 245 and operating applications 250 as illustratively shown by the arrow. The OS layer may interoperate with the application and hardware layers to perform various functions and features.

Returning to FIG. 1, the geo-replicated IoT hub 110 can provide remote services for IoT devices 105. For example, the geo-replicated IoT hub can provide centralization for data collected by IoT device sensors, and can enable real-time data access for device operators, administrators, and owners using respective computing devices such as a laptop, personal computer (PC), smartphone, tablet computing device, and the like (not shown). The provided IoT services may utilize data from respective IoT devices for certain operations or features, such as providing artificial intelligence (AI) or machine learning operations with specific AI-configured processors and code, automation processing for businesses, run real-time analytic computations on the data streaming from IoT devices, and the like.

Figure 3:
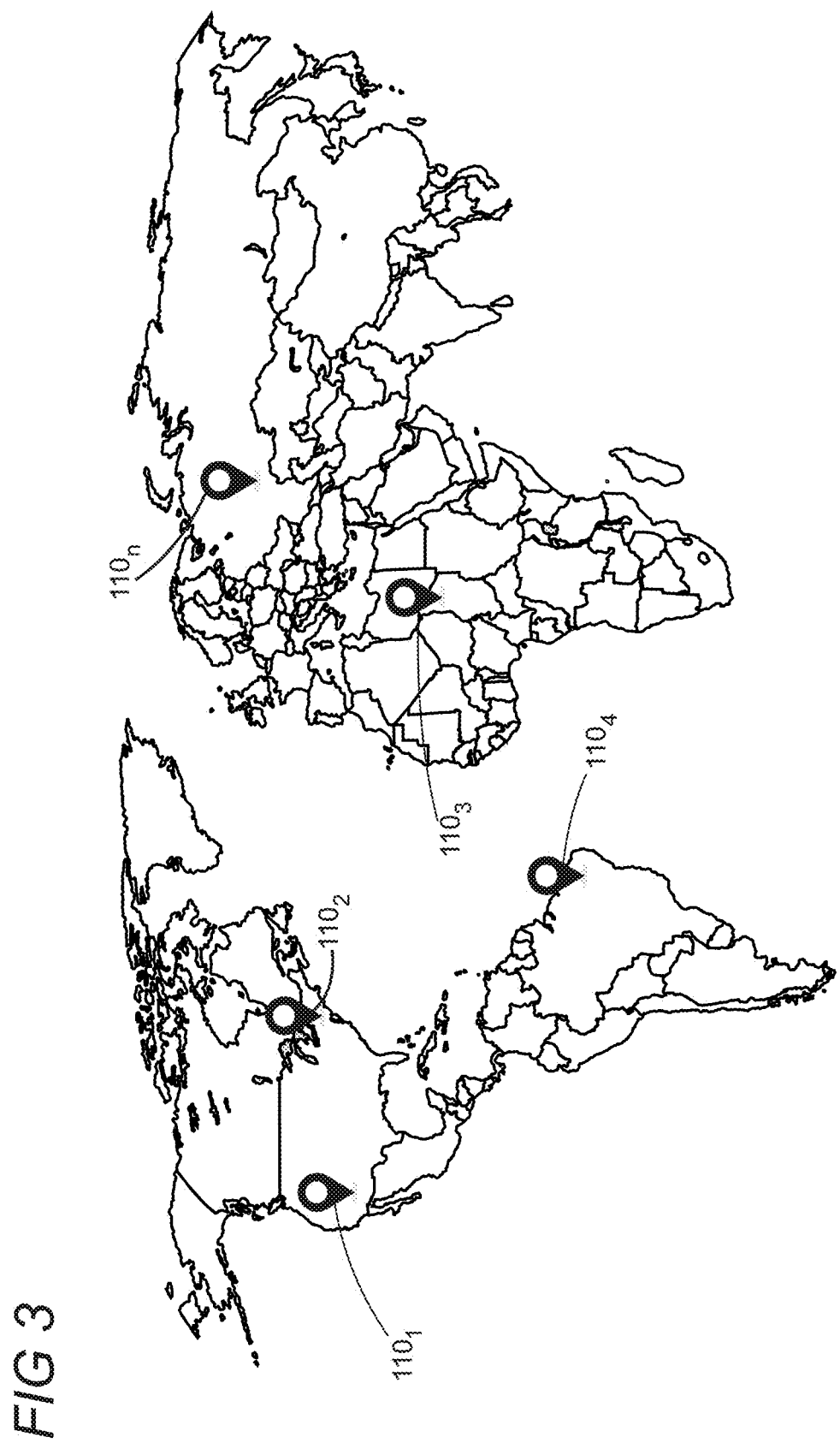
FIG. 3 shows an illustrative geography with geo-replicated IoT hubs.

FIG. 3 shows an illustrative geographical map in which various geo-replicated IoT hubs 110 are placed and cover various regions of the world. The geo-replicated IoT hubs may be divided by region such that IoT devices positioned in a certain location may be owned by the geo-replicated IoT hub utilized for that specific region. When a geo-replicated IoT hub owns an IoT device, then that IoT device and geo-replicated IoT hub are connected with each other, transmit data to each other, and perform other operations together. For example, the IoT device transmits D2C (device-to-cloud) messages to the geo-replicated IoT hub, such as temperature readings from a heat sensor on a thermostat. The geo-replicated IoT hub sends C2D (cloud-to-device) messages or commands to the IoT device such as start, stop, reset, etc. The geo-replicated IoT hub may receive all telemetry data for that IoT device and no other geo-replicated IoT hub will receive such data directly from the IoT device unless a failover event occurs as discussed in greater detail below, such as a change in geo-location of the IoT device. However, the geo-replicated IoT hub transmits the data to the other geo-replicated IoT hubs for data redundancy.

FIG. 4A shows an illustrative environment showing interactions among the IoT device and various geo-replicated IoT hubs, using the reference table 415 for guidance. The geo-replicated IoT hubs include the first geo-replicated IoT hub 110, target geo-replicated IoT hub 405, and a second geo-replicated IoT hub 115. Each geo-replicated IoT hub represents the various and distinct region in which the respective IoT hub is located. Thus, the first geo-replicated IoT hub and the target geo-replicated IoT hub may cover distinct regions of the world. For example, the first geo-replicated IoT hub may be located on and cover the western part of the United States and the target geo-replicated IoT hub may be located on and cover the eastern part of the United States. In other implementations, the first geo-replicated IoT hub may cover Europe, the second geo-replicated IoT hub may cover Asia, and the target geo-replicated IoT hub may cover North America. The regions may be comprised of a specific perimeter or other division to define the geo-replicated boundaries, and may make up continents, countries, states, or use another parameter.

The IoT device 105 is owned by the first geo-replicated IoT hub 110 as illustratively shown by the star. FIG. 4A illustratively shows the current data path for transmitting telemetry data from the IoT device to the first geo-replicated IoT hub because the first geo-replicated IoT hub owns the IoT device. In contrast, there is no current data path connection established between the IoT device and the other IoT hubs since neither owns the IoT device.

Figure 4B:
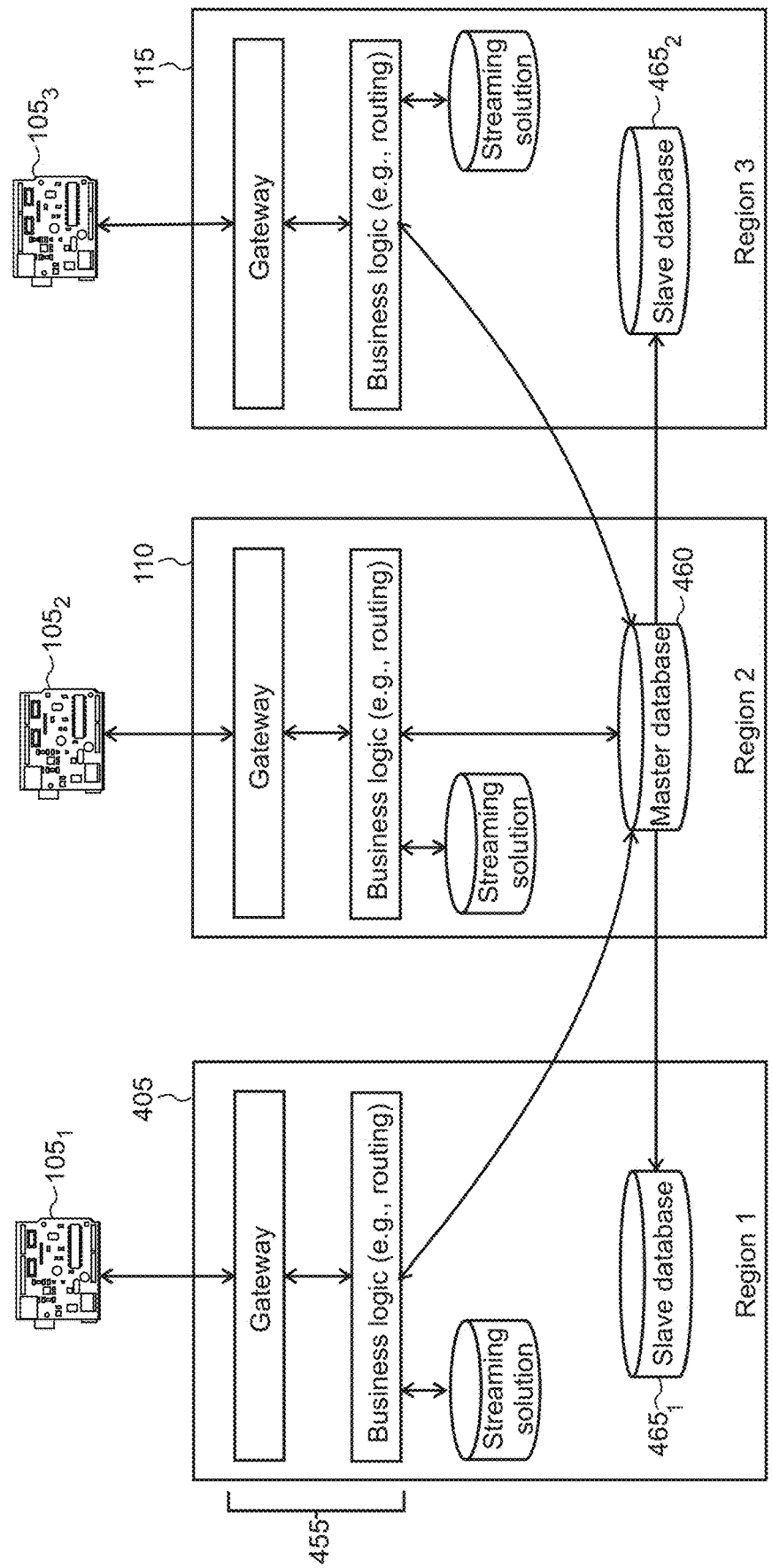
FIG. 4B shows an illustrative diagram in which the interoperability of stateless services enables data redundancy across regions.

FIG. 4B shows an illustrative diagram in which IoT devices 105 can utilize stateless services provided by a given geo-replicated IoT hub, while connecting with and utilizing another geo-replicated IoT hub that owns the respective IoT device. Stateless services can be functionally separate from storage or can be storage that is not the authoritative source of the data (e.g., cache). For example, certain services provided by a geo-replicated IoT hub include networking and gateway functionality and business logic (e.g., routing), as illustratively shown by numeral 455. There may be two levels of the design in typical implementations. One design can implement a master database from which other slave databases can sync state. In this implementation, a quorum may not be implemented. In the other design, each geo-replicated IoT hub has its own master database (e.g., there is no slave database) and a quorum is utilized to sync device ownership.

The gateway and streaming solution (e.g., event hub, kafka streams, etc.) interoperate to implement business logic such as domain control, device management, routing, and jobs for device scheduling and updates, among other services. These stateless services are available for IoT devices even if the IoT device is owned by another geo-replicated IoT hub.

In this implementation, IoT devices 1051 and 1053 connect to the master database 460 associated with the first geo-replicated IoT hub 110 inside Region 2, while using the stateless services 455 in their respectively distinct Regions 1 and 3. The slave databases 465 may be located in the respective regions for the IoT devices, but the adaptability and utilization of the stateless services enable the IoT devices to communicate with the master database in a distinct region. IoT device 1052 can likewise use the stateless services provided by the first geo-replicated IoT hub 110 when using one of the other geo-replicated IoT hubs.

The interoperability of stateless services with other regional geo-replicated IoT hubs enables data replication and redundancy across regions. For example, IoT devices can use the stateless services provided by a regional geo-replicated IoT hub when the IoT devices are owned by a geo-replicated IoT hub in another region. Discussion of data replication herein pertains to replicating state data, such as telemetry data and other data stored within the slave and master databases, and not with respect to stateless data associated with the stateless services (e.g., cache storage, business logic).

FIGS. 5A-B show illustrative environments in which the IoT device 105 switches its connection to the target geo-replicated IoT hub 405 so that the target geo-replicated IoT hub takes ownership over the IoT device, that is, D2C and C2D messages are exchanged between the devices. The target geo-replicated IoT hub takes ownership over the IoT device from the previous owner, which in this scenario is the first geo-replicated IoT hub 110. FIGS. 5A and 5B respectively illustrate different events which could facilitate an IoT device's failover to another geo-replicated IoT hub.

In FIG. 5A, the IoT device 105 moves its location from the western region 510 to the eastern region 515 of the United States, which is covered by the target geo-replicated IoT hub. Boundary 505 illustratively shows the divisional boundary between the various regions. The dashed double-arrowed line between the IoT device's previous location 520 and the first geo-replicated IoT hub 110 represents the previous ownership by the first geo-replicated IoT hub and its stale connection with the IoT device 105. The solid double-arrowed line between the IoT device and the target geo-replicated IoT hub represents the new ownership of the IoT device by the target geo-replicated IoT hub 405.

In FIG. 5B, the IoT device 105 maintains its location within the western region 510 but nonetheless connects with and is owned by the target geo-replicated IoT hub 405. In this example, the first geo-replicated IoT hub may be experiencing one or a variety of issues such as technical failure or infrastructure deficiencies. In other scenarios, the customer can use a client computing device (e.g., laptop computer, smartphone, etc.) to proactively trigger IoT device migration from one region to another to perform a planned maintenance in one of the regions. Thus, a customer of the IoT device may initiate a request to switch the IoT device's connection or the IoT device may automatically fail over to the target geo-replicated IoT hub in situations in which the first geo-replicated IoT hub fails, such as due to weather, malicious attack, power outage, etc. Regardless of the reason for switching or what event occurs that facilitates the failover to the target geo-replicated IoT hub or any other geo-replicated IoT hub, failover provisions are utilized to maintain seamless connectivity, maintain data redundancy, and/or facilitate data recovery.

Figure 6:
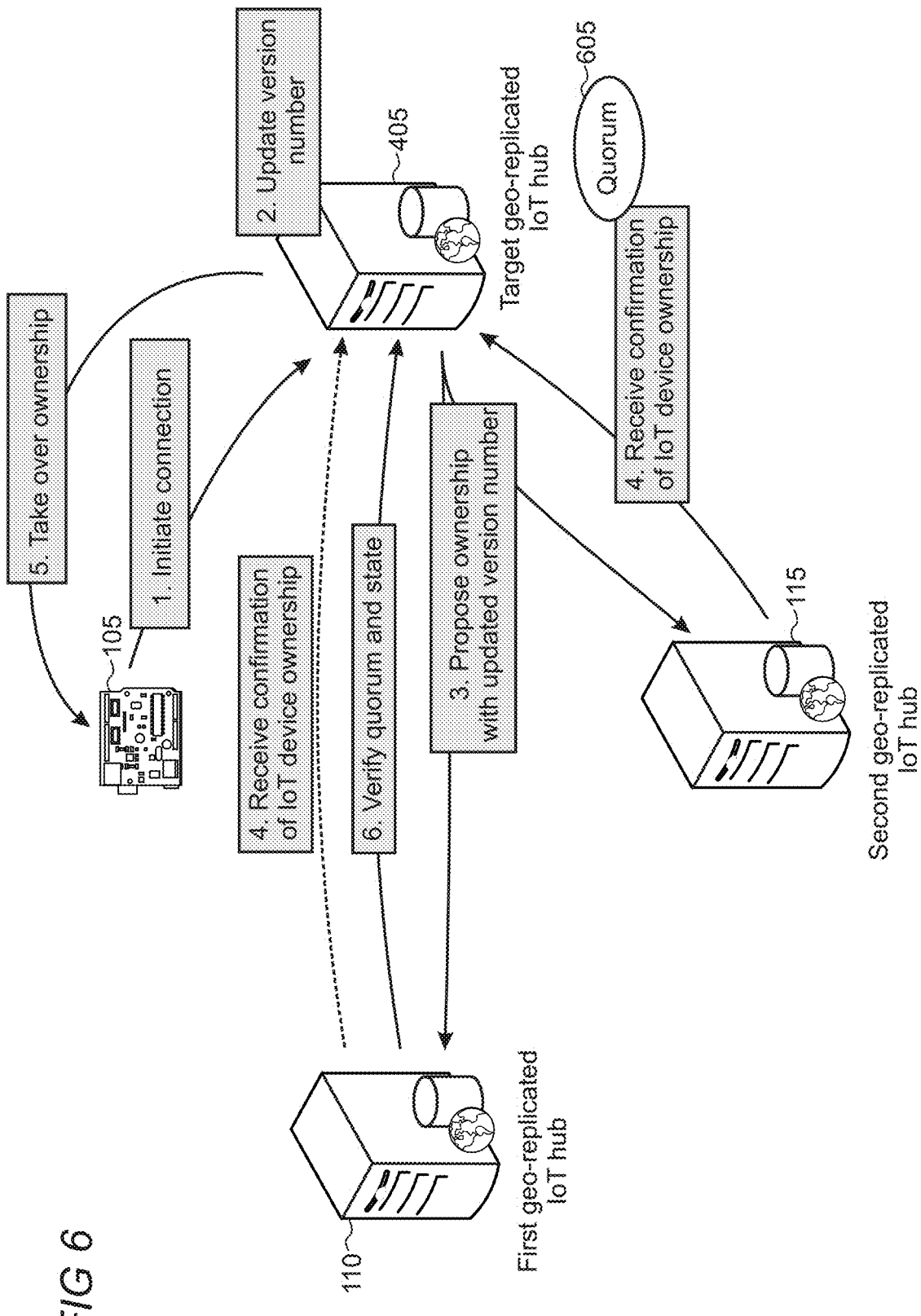
FIG. 6 shows an illustrative workflow for switching ownership of the IoT device among geo-replicated IoT hubs.

FIG. 6 shows an illustrative diagram showing the workflow for failover procedures in which the IoT device 105 switches connection from the first geo-replicated IoT hub 110 to the target geo-replicated IoT hub 405. The IoT device may initiate a connection with the target geo-replicated IoT hub upon changing its geo-location or because the first geo-replicated IoT hub exhibits a technical failure (FIGS. 5A-B). The target geo-replicated IoT hub either receives a request from the IoT device to establish the connection or the target geo-replicated IoT hub recognizes the location of the IoT device.

The target geo-replicated IoT hub then updates a version number for the IoT device. While use of a version number is discussed, other version values that can be updated are also possible, such as alpha-numeric values or other codes. Each geo-replicated IoT hub syncs and stores a common version number for each IoT device. Updating the version number responsive to a connection request from, or initiating a connection with, the IoT device provides an indication that the target geo-replicated IoT hub is the new owner of the IoT device. Updating the version number can include incrementing a number or performing some other function that, upon showing to the other geo-replicated IoT hubs, verifies ownership of the IoT device by the new geo-replicated IoT hub.

The target geo-replicated IoT hub then proposes the updated version number to the first and second geo-replicated IoT hubs. Since the version number for that IoT device has been updated (e.g., an incremented number), the first and second geo-replicated IoT hubs can compare the updated version number with that stored by the other IoT hubs. After performing the comparison, one or both the first and second geo-replicated IoT hubs can confirm ownership by the target geo-replicated IoT hub by, for example, verifying the updated version number is the highest version number for that IoT device. The target geo-replicated IoT hub cannot assume ownership over the IoT device until receiving a quorum 605 among the geo-replicated IoT hubs. The quorum may be based on a group of IoT hubs and may not necessarily include each and every available geo-replicated IoT hub. For example, there can be two groups each containing three geo-replicated IoT hubs.

If a failover occurs due to technical issues at the first geo-replicated IoT hub, then the target geo-replicated IoT hub can establish the connection using the confirmation from the second geo-replicated IoT hub and without receiving confirmation from the first geo-replicated IoT hub (the dashed line in FIG. 6 represents the confirmation is optional). In this illustrative example, one confirmation is sufficient for a quorum since there are three total IoT hubs. An odd number of geo-replicated IoT hubs may be implemented so that there can be an established quorum.

After the quorum is established, the target geo-replicated IoT hub takes over ownership of the IoT device and establishes the connection. The IoT device may subsequently transfer telemetry data and other D2C messages to the target geo-replicated IoT hub and the target geo-replicated IoT hub sends C2D messages and commands to the IoT device. In scenarios in which the first geo-replicated IoT hub experiences a technical failure or outage, it verifies with one or more geo-replicated IoT hubs the quorum to find the current owner of the IoT device and state of data to update its data records.

Figure 7:
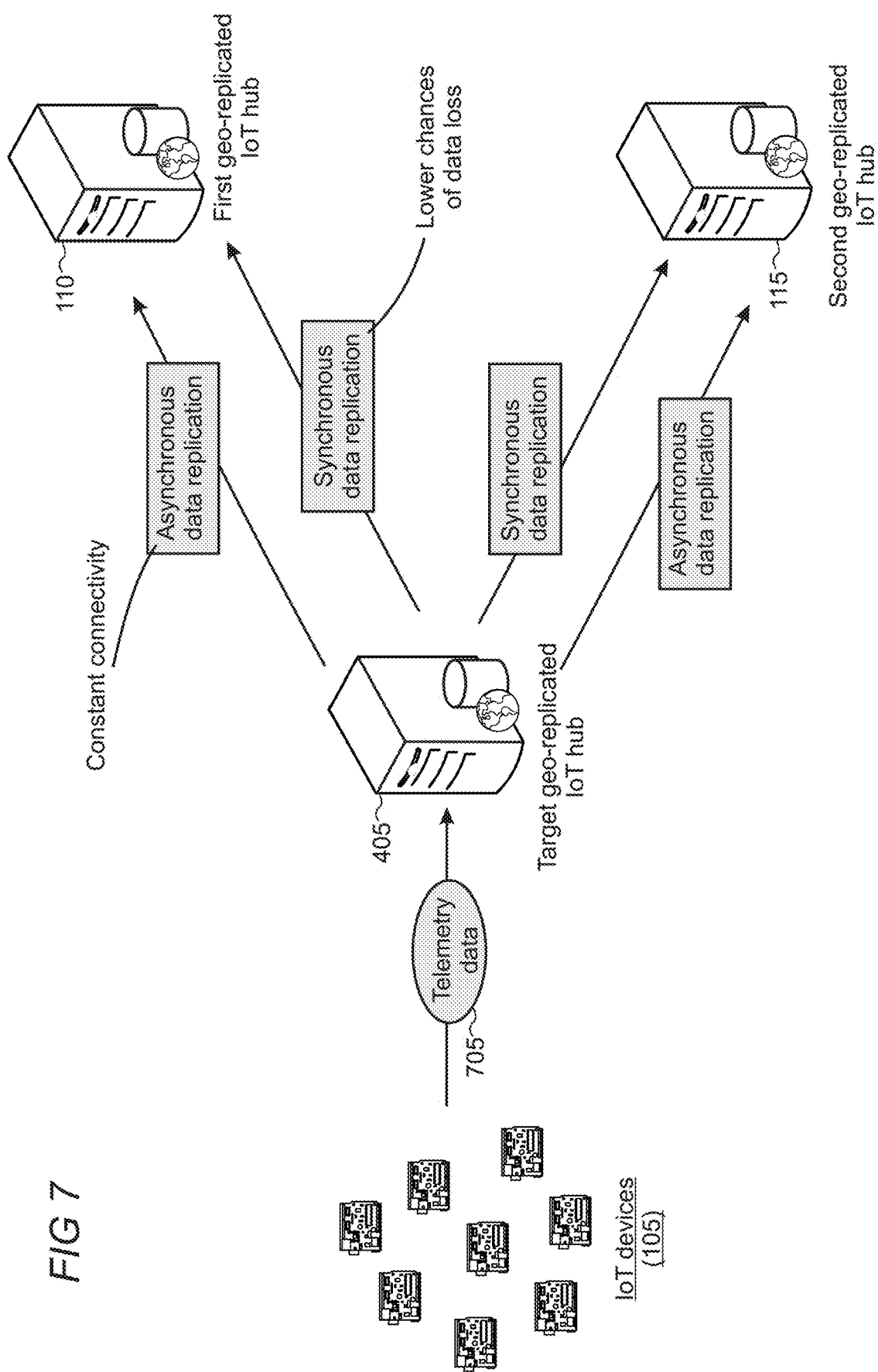
FIG. 7 shows an illustrative diagram of synchronous and asynchronous data replication across geo-replicated IoT hubs.

Regardless of the geo-replicated IoT hub that is utilized, the one which has ownership over a respective IoT device syncs data among other geo-replicated IoT hubs for backup and fault tolerance. As illustratively shown in FIG. 7, the telemetry data 705 can be synchronously or asynchronously replicated. Synchronous data replication indicates that the data is not written to the target geo-replicated IoT hub 405 until it is synced across the first and second geo-replicated IoT hubs 110 and 115. Asynchronous data replication occurs subsequent to a write to the target geo-replicated IoT hub, such as at a more convenient time for operations. These differences facilitate the advantages for both techniques. Asynchronous data replication can provide constant connectivity for IoT devices since the target geo-replicated IoT hub continues to receive data if the data is not synced across IoT hubs. Synchronous data replication can provide lower chances of data loss since the data is automatically synced across devices. The type of data synchronization may depend on the type of device and/or the customer's choice. For example, constant connectivity using asynchronous data replication may be more advantageous for smart door locks so that the door can always be opened and closed. Greater data consistency can be achieved using synchronous data replication in scenarios in which constant network connectivity is not necessary, but the data has intrinsic value, such as for medical records.

Figure 8:
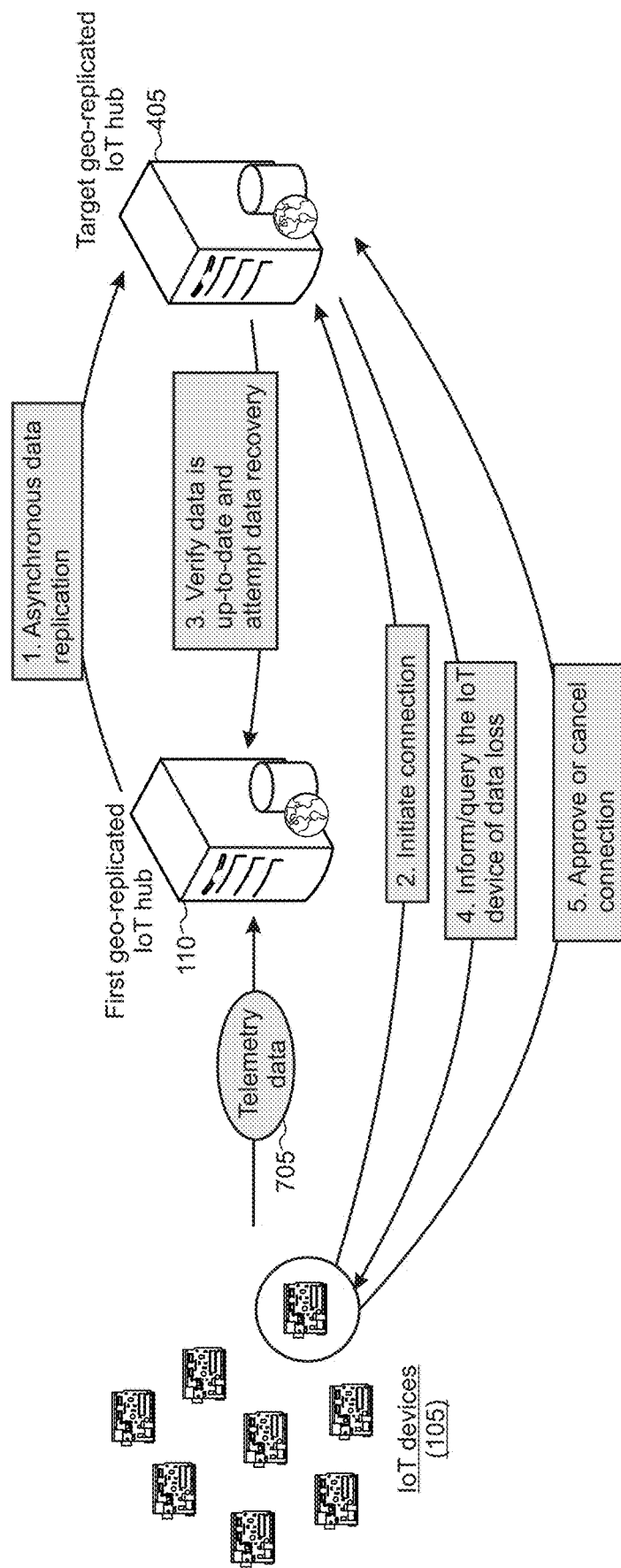
FIG. 8 shows an illustrative workflow for switching ownership of the IoT device when asynchronous data replication is utilized.

FIG. 8 shows an illustrative diagram showing the failover workflow when asynchronous data replication is implemented. In this example, the IoT device 105 is still connected with the first geo-replicated IoT hub 110 and then subsequently attempts to connect with the target geo-replicated IoT hub 405. At least for this specific IoT device, the data is replicated asynchronously with the target geo-replicated IoT hub. The data may also be synchronized with the second geo-replicated IoT hub, which is not shown for clarity in exposition. As the data is asynchronously replicated, the IoT device initiates the connection with the target geo-replicated IoT hub.

Responsive to initiating the connection with the IoT device, the target geo-replicated IoT hub 405 verifies that its data is up-to-date with that stored in the first geo-replicated IoT hub and attempts data recovery if the data is not up-to-date. An epoch number may be maintained by each geo-replicated IoT hub which is increased each time a data update for the respective IoT device occurs. An indication of data loss is present if the epoch number is different than that which is maintained by the first geo-replicated IoT hub. Alternatively, the target geo-replicated IoT hub may not be able to communicate with the first geo-replicated IoT hub if it is experiencing technical issues.

The epoch number may be reset to zero when a new geo-replicated IoT hub assumes ownership over the IoT device. The epoch number and version number are utilized together to form a tag and determine a latest view of the IoT device. For example, the version number for the IoT device is incremented upon switching ownership to a new geo-replicated IoT hub. The version number is the high order word and the epoch number is the low order word to form the specific tag for that IoT device. This tag is periodically synchronized across geo-replicated IoT hubs.

If data recovery is unsuccessful (e.g., because the first geo-replicated IoT hub is experiencing technical issues), then the target geo-replicated IoT hub informs the IoT device of the potential data loss and queries the IoT device whether to proceed with the connection. The IoT device can then either approve or cancel the connection. Approving the connection may result in accepting the data loss and canceling the connection may cause the IoT device to maintain its connection with the first geo-replicated IoT hub so no data loss occurs.

Figure 9:
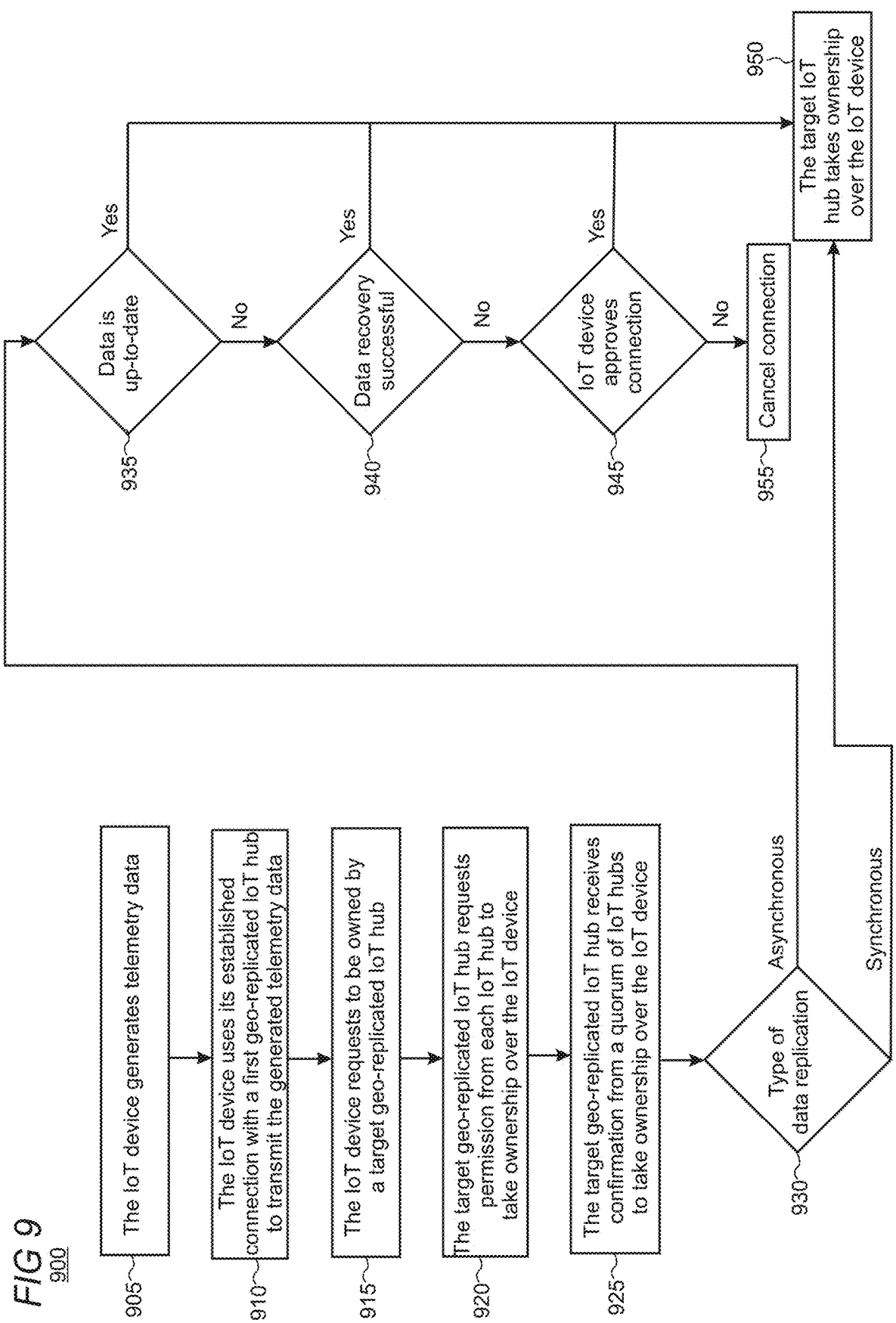
FIG. 9 shows an illustrative comprehensive flowchart of switching ownership of the IoT device among IoT hubs.

FIG. 9 is a flowchart of an illustrative method 900 in which various geo-replicated IoT hubs and the IoT device operates. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 905, the IoT device generates telemetry data. The IoT device can be, for example, a thermometer with a temperature sensor that picks up temperature readings for the telemetry data. Other examples of IoT devices can include a proximity sensor to detect motion, pressure sensors to measure gas or liquid and convert the measurement to an electrical signal. In step 910, the IoT device uses an established connection with the first geo-replicated IoT hub to transmit the generated telemetry data derived from the sensor. The IoT device may be currently owned by the first geo-replicated IoT hub and therefore C2D and D2C messages are transmitted between those two devices.

In step 915, the IoT device requests to be owned by a target geo-replicated IoT hub. This may be facilitated by the geo-location of the IoT device changing to a geographical region that is controlled by the target geo-replicated IoT hub, there is some infrastructure deficiency or technical failure with the first geo-replicated IoT hub, or responsive to a customer's request executed on a client computing device. In any case the IoT device seeks to fail over to the target geo-replicated IoT hub. In step 920, the target geo-replicated IoT hub requests permission from other available geo-replicated IoT hubs to take ownership over the IoT device. This may occur by updating a version number and transmitting the updated version number to each geo-replicated IoT hub. If the updated version number is greater than a currently known version number for that IoT device, then confirmation is transmitted to the target geo-replicated IoT hub to take ownership over the IoT device, as shown in step 925. A confirmatory quorum among the geo-replicated IoT hubs is utilized so that there is only one geo-replicated IoT hub that owns the IoT device at a given time. This way, two geo-replicated IoT hubs are not concurrently transmitting C2D to or receiving D2C messages from the IoT device, which can affect data consistency. The quorum among the geo-replicated IoT hubs may be based on a selected group of geo-replicated IoT hubs or all available geo-replicated IoT hubs. Thus, for example, if there are six total geo-replicated IoT hubs across the world, two groups of three may be formed. In typical implementations there may be an odd number of available geo-replicated IoT hubs, either in total or within a group, so that a quorum is capable of being established.

In step 930, if synchronous data replication was utilized for that IoT device, then the process proceeds to step 950 in which the target geo-replicated IoT hub takes ownership over the IoT device. If asynchronous data replication was utilized for that IoT device, the target geo-replicated IoT hub verifies with the first geo-replicated IoT hub that the data is up-to-date as shown in step 935. For example, an epoch number may be incremented each time a data update occurs for an IoT device. If there is an epoch number mismatch between the target geo-replicated IoT hub and the first geo-replicated IoT hub, then this may indicate there is a fault in the data. As shown in step 935, if the data is up-to-date (e.g., the epoch number matches) then the target geo-replicated IoT hub takes ownership over the IoT device in step 950. If the data is not up-to-date then the target geo-replicated IoT hub attempts data recovery with the first geo-replicated IoT hub.

In step 940, if the data recovery is successful then the target geo-replicated IoT hub takes ownership over the IoT device as shown in step 950. In some situations, the target geo-replicated IoT hub may be unsuccessful in the data recovery attempt, such as if the first geo-replicated IoT hub is experiencing technical failures. If data recovery is unsuccessful then the telemetry data from the IoT device may be lost upon the target geo-replicated IoT hub taking ownership over the IoT device. The target geo-replicated IoT hub informs the IoT device that there is data loss and queries the IoT device to determine whether to connect.

In step 945, the IoT device can approve the connection, in which case the target geo-replicated IoT hub takes ownership over the IoT device in step 950 and accepts the data loss. If the IoT device rejects the connection, then the connection is cancelled as shown in step 955. The IoT device may attempt connection with the first geo-replicated IoT hub or fail over to another geo-replicated IoT hub. In other implementations, a third party service, user application, or a policy that is defined by the IoT hubs can be used to determine whether or not to establish the connection despite the data loss.

Figure 10:
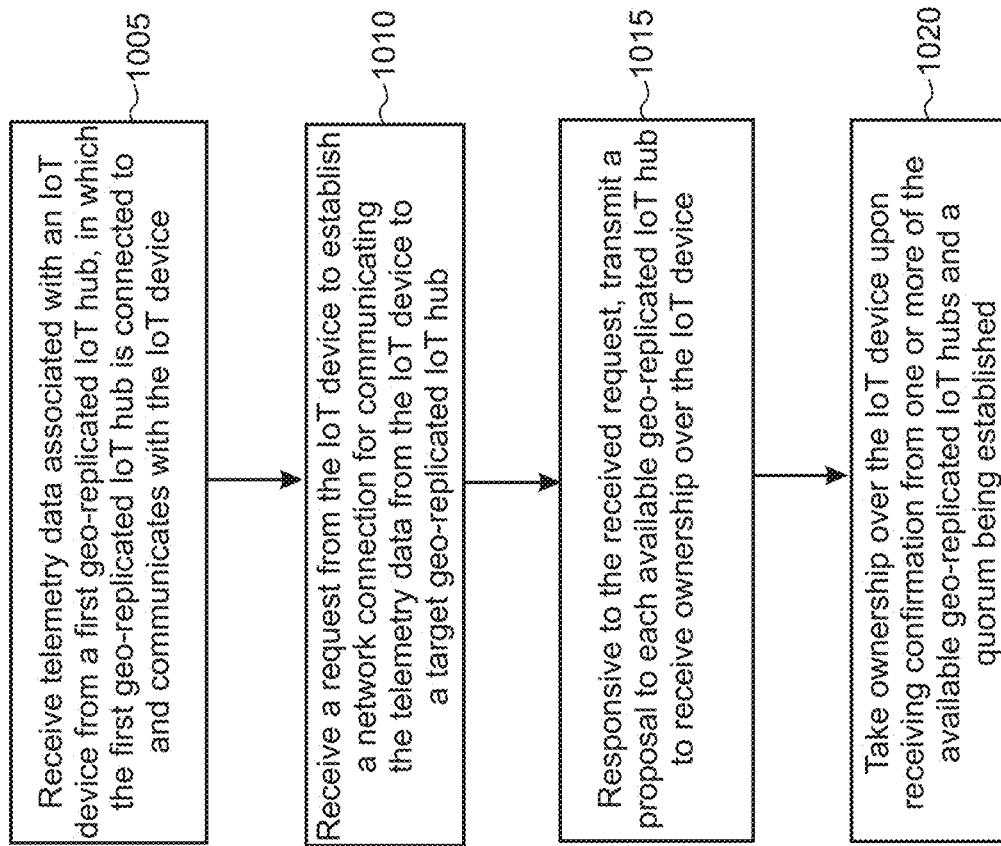
FIGS. 10-12 show illustrative processes performed by one or more IoT hubs, IoT devices, or user computing devices.
Figure 11:
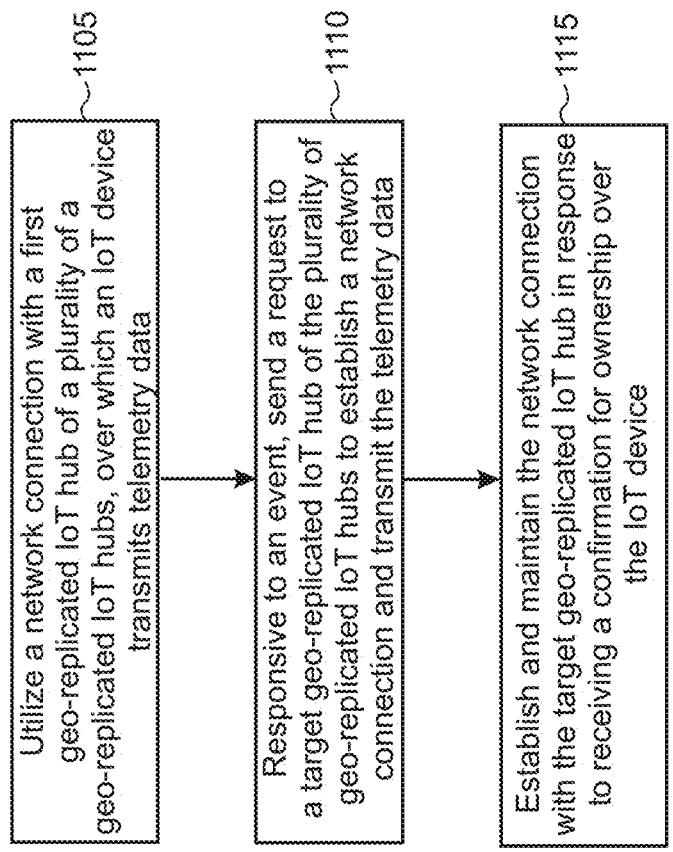

FIG. 10 is a flowchart of an illustrative method 1000 that may be performed by a given geo-replicated IoT hub, such as a target geo-replicated IoT hub. In step 1005, telemetry data associated with an IoT device is received from a first geo-replicated IoT hub, in which the first geo-replicated IoT hub is connected to and communicates with the IoT device to receive telemetry data. In step 1010, a request from the IoT device is received at the target geo-replicated IoT hub to establish a network connection for communicating the telemetry data from the IoT device to the target geo-replicated IoT hub. In step 1015, responsive to the received request, a proposal is transmitted to each available geo-replicated IoT hub to receive ownership over the IoT device. In step 1020, ownership over the IoT device is taken upon receiving confirmation from one or more of the available geo-replicated IoT hubs and a quorum being established among the plurality of geo-replicated IoT hubs for the target geo-replicated IoT hub to take ownership over the IoT device FIG. 11 is a flowchart of an illustrative method 1100 performed by an IoT device which is configured with one or more sensors and network connectivity. In step 1105, the IoT device utilizes a network connection with a first geo-replicated IoT hub of a plurality of geo-replicated IoT hubs, over which the IoT device transmits telemetry data. In step 1110, responsive to an event, the IoT device sends a request to a target geo-replicated IoT hub to establish a network connection and transmit the telemetry data. In step 1115, the IoT device establishes and maintains the network connection with the target geo-replicated IoT hub in response to receiving a confirmation for ownership over the IoT device from the target geo-replicated IoT hub. The IoT device establishes and maintains the network connection to the target geo-replicated IoT hub when a quorum is present among each of the plurality of geo-replicated IoT hubs which indicates that the target geo-replicated IoT hub is an owner over the IoT device. The target geo-replicated IoT hub, as owner of the IoT device, is responsible for receiving D2C (device-to-cloud) messages from the IoT device and sending C2D (cloud-to-device) messages to the IoT device.

Figure 12:
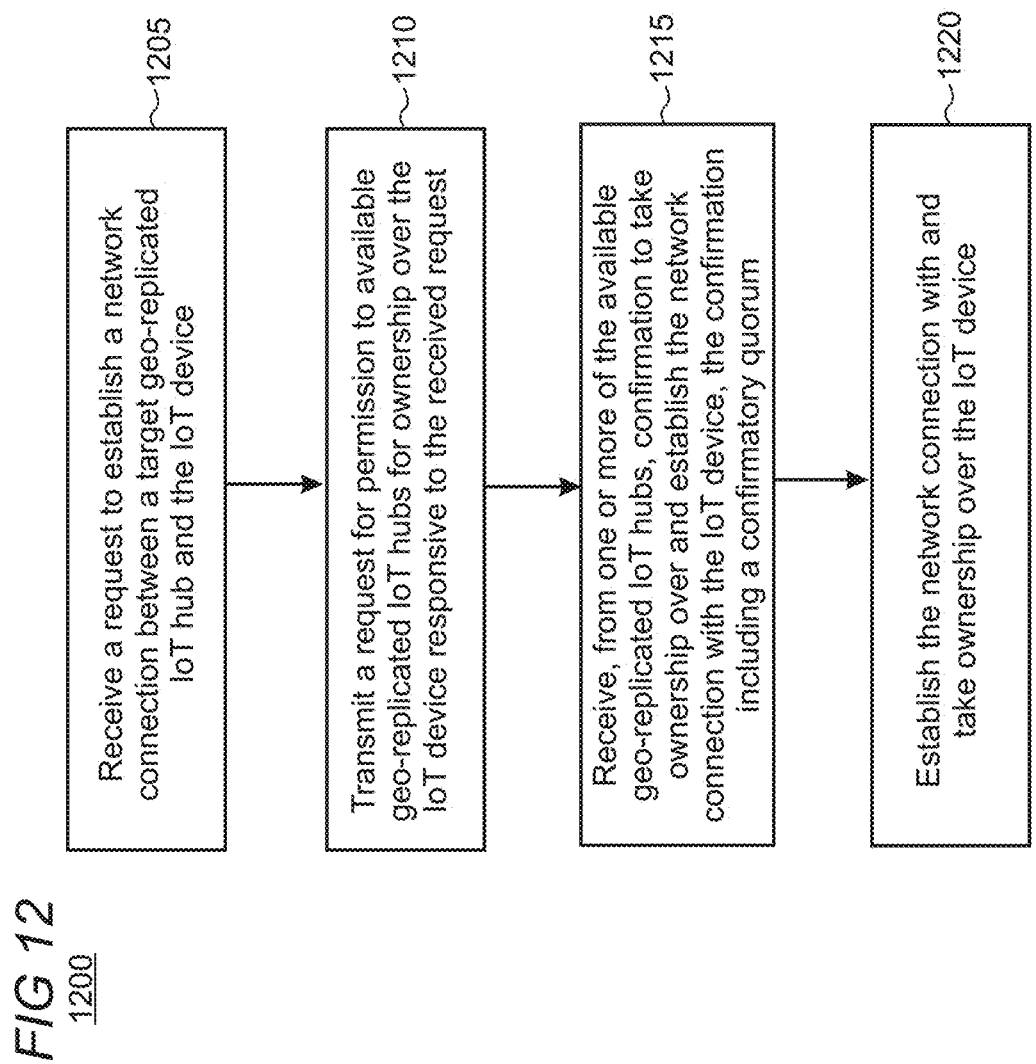

FIG. 12 is a flowchart of an illustrative method 1200 performed by a target geo-replicated IoT hub. In step 1205, a request to establish a network connection between the target geo-replicated IoT hub and an IoT device is received at the target geo-replicated IoT hub. In step 1210, a request for permission is transmitted to available geo-replicated IoT hubs for ownership over the IoT device responsive to the received request. In step 1215, confirmation to take ownership over and establish the network connection with the IoT device is received from one or more of the available geo-replicated IoT hubs. The confirmation includes a confirmatory quorum among the geo-replicated IoT hubs. In step 1220, the target geo-replicated IoT hub establishes the network connection with and takes ownership over the IoT device.

Figure 13:
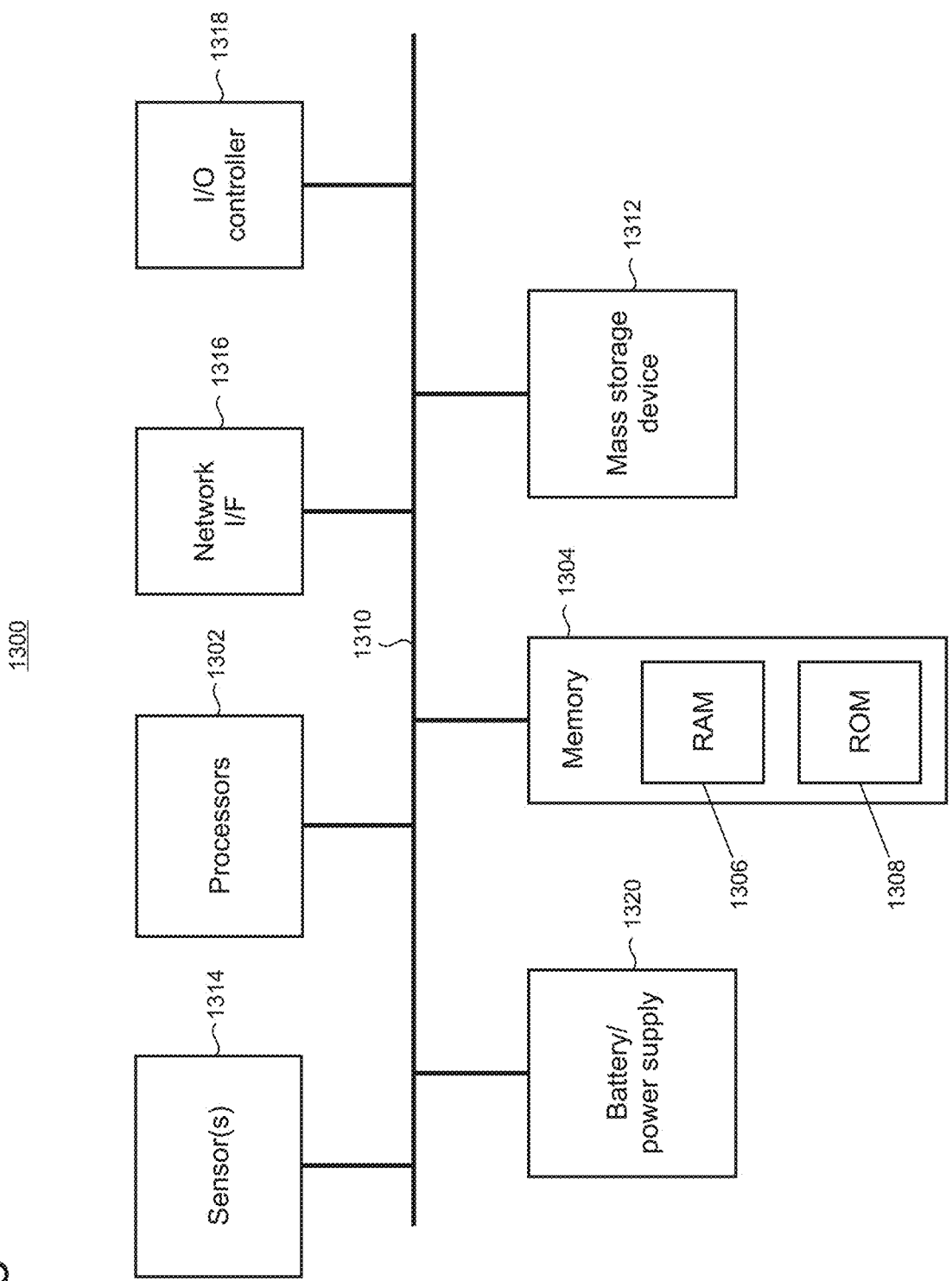
FIG. 13 is a simplified block diagram of an illustrative computing system or IoT device that may be used in part to implement the present geo-replicated IoT hub.

FIG. 13 shows an illustrative architecture 1300 for a device capable of executing the various components and operations described herein for the present geo-replicated IoT hub, such as a computing device operated by a user or an IoT device. The architecture 1300 illustrated in FIG. 13 includes one or more processors 1302 (e.g., central processing unit, dedicated AI chip, graphics processing unit, etc.), a system memory 1304, including RAM (random access memory) 1306 and ROM (read only memory) 1308, and a system bus 1310 that operatively and functionally couples the components in the architecture 1300. A basic input/output system containing the basic routines that help to transfer information between elements within the architecture 1300, such as during startup, is typically stored in the ROM 1308. The architecture 1300 further includes a mass storage device 1312 for storing software code or other computer-executed code that is utilized to implement applications, the file system, and the operating system. The mass storage device 1312 is connected to the processor 1302 through a mass storage controller (not shown) connected to the bus 1310. The mass storage device 1312 and its associated computer-readable storage media provide non-volatile storage for the architecture 1300. Although the description of computer-readable storage media contained herein refers to a mass storage device, such as a hard disk or CD-ROM drive, it may be appreciated by those skilled in the art that computer-readable storage media can be any available storage media that can be accessed by the architecture 1300.

The architecture 1300 further supports one or more sensors 1314 comprising various types of sensors or components that are configured to detect parameters that are descriptive of the environment and create electrical signals that can be transmitted over a network. Sensors can include pressure sensors, temperature sensors, proximity sensors, optical sensors, and the like, depending on the specific configuration, use, and purpose of the IoT device. The architecture further supports a battery or a power supply (collectively identified by reference numeral 1320). For example, one or more batteries or power supplies may be rechargeable or replaceable, or may include an AC/DC plug, depending on the type of computing device or IoT device to which the architecture applies.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1300.

According to various embodiments, the architecture 1300 may operate in a networked environment using logical connections to remote computers through a network. The architecture 1300 may connect to the network through a network interface unit 1316 connected to the bus 1310. It may be appreciated that the network interface unit 1316 also may be utilized to connect to other types of networks and remote computer systems. The architecture 1300 also may include an input/output controller 1318 for receiving and processing input from a number of other devices, including a keyboard, mouse, touchpad, touchscreen, control devices such as buttons and switches or electronic stylus (not shown in FIG. 13). Similarly, the input/output controller 1318 may provide output to a display screen, user interface, a printer, or other type of output device (also not shown in FIG. 13).

The architecture 1300 may include a voice recognition unit (not shown) to facilitate user interaction with a device supporting the architecture through voice commands, a natural language interface, or through voice interactions with a personal digital assistant (such as the Cortana® personal digital assistant provided by Microsoft Corporation). The architecture 1300 may include a gesture recognition unit (not shown) to facilitate user interaction with a device supporting the architecture through sensed gestures, movements, and/or other sensed inputs.

It may be appreciated that the software components described herein may, when loaded into the processor 1302 and executed, transform the processor 1302 and the overall architecture 1300 from a general-purpose computing system into a special-purpose computing system customized to facilitate the functionality presented herein. The processor 1302 may be constructed from any number of transistors or other discrete circuit elements, which may individually or collectively assume any number of states. More specifically, the processor 1302 may operate as a finite-state machine, in response to executable instructions contained within the software modules disclosed herein. These computer-executable instructions may transform the processor 1302 by specifying how the processor 1302 transitions between states, thereby transforming the transistors or other discrete hardware elements constituting the processor 1302.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1300 in order to store and execute the software components presented herein. It also may be appreciated that the architecture 1300 may include other types of computing devices, including wearable devices, handheld computers, embedded computer systems, smartphones, PDAs, and other types of computing devices known to those skilled in the art. It is also contemplated that the architecture 1300 may not include all of the components shown in FIG. 13, may include other components that are not explicitly shown in FIG. 13, or may utilize an architecture completely different from that shown in FIG. 13.

Figure 14:
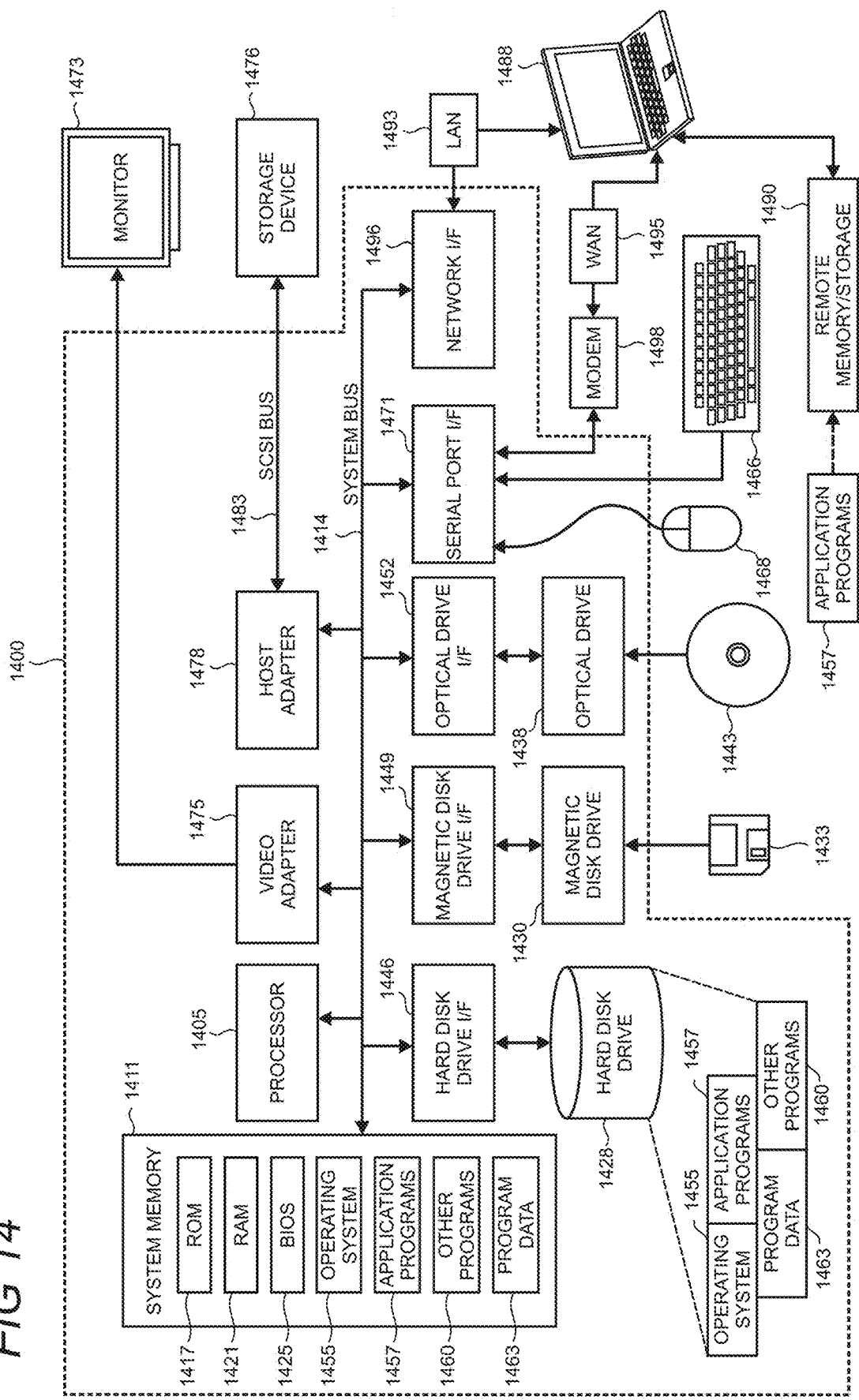
FIG. 14 is a simplified block diagram of an illustrative computer system that may be used in part to implement the present geo-replicated IoT hub.

FIG. 14 is a simplified block diagram of an illustrative computer system 1400 such as a server which may be used to implement the present geo-replicated IoT hub. Computer system 1400 includes a processor 1405, a system memory 1411, and a system bus 1414 that couples various system components including the system memory 1411 to the processor 1405. The system bus 1414 may be any of several types of bus structures including a memory bus or memory controller, a peripheral bus, or a local bus using any of a variety of bus architectures. The system memory 1411 includes read only memory (ROM) 1417 and random access memory (RAM) 1421. A basic input/output system (BIOS) 1425, containing the basic routines that help to transfer information between elements within the computer system 1400, such as during startup, is stored in ROM 1417. The computer system 1400 may further include a hard disk drive 1428 for reading from and writing to an internally disposed hard disk (not shown), a magnetic disk drive 1430 for reading from or writing to a removable magnetic disk 1433 (e.g., a floppy disk), and an optical disk drive 1438 for reading from or writing to a removable optical disk 1443 such as a CD (compact disc), DVD (digital versatile disc), or other optical media. The hard disk drive 1428, magnetic disk drive 1430, and optical disk drive 1438 are connected to the system bus 1414 by a hard disk drive interface 1446, a magnetic disk drive interface 1449, and an optical drive interface 1452, respectively. The drives and their associated computer-readable storage media provide non-volatile storage of computer-readable instructions, data structures, program modules, and other data for the computer system 1400. Although this illustrative example includes a hard disk, a removable magnetic disk 1433, and a removable optical disk 1443, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present geo-replicated IoT hub, as used herein, the term computer-readable storage media includes one or more instances of a media type (e.g., one or more magnetic disks, one or more CDs, etc.). For purposes of this specification and the claims, the phrase "computer-readable storage media" and variations thereof, are non-transitory and do not include waves, signals, and/or other transitory and/or intangible communication media.

A number of program modules may be stored on the hard disk, magnetic disk, optical disk, ROM 1417, or RAM 1421, including an operating system 1455, one or more application programs 1457, other program modules 1460, and program data 1463. A user may enter commands and information into the computer system 1400 through input devices such as a keyboard 1466 and pointing device 1468 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1405 through a serial port interface 1471 that is coupled to the system bus 1414, but may be connected by other interfaces, such as a parallel port, game port, or universal serial bus (USB). A monitor 1473 or other type of display device is also connected to the system bus 1414 via an interface, such as a video adapter 1475. In addition to the monitor 1473, wearable devices and personal computers can typically include other peripheral output devices (not shown), such as speakers and printers. The illustrative example shown in FIG. 14 also includes a host adapter 1478, a Small Computer System Interface (SCSI) bus 1483, and an external storage device 1476 connected to the SCSI bus 1483.

The computer system 1400 is operable in a networked environment using logical connections to one or more remote computers, such as a remote computer 1488. The remote computer 1488 may be selected as a personal computer, a server, a router, a network PC, a peer device, or other common network node, and typically includes many or all of the elements described above relative to the computer system 1400, although only a single representative remote memory/storage device 1490 is shown in FIG. 14. The logical connections depicted in FIG. 14 include a local area network (LAN) 1493 and a wide area network (WAN) 1495.

Such networking environments are often deployed, for example, in offices, enterprise-wide computer networks, intranets, and the Internet.

When used in a LAN networking environment, the computer system 1400 is connected to the local area network 1493 through a network interface or adapter 1496. When used in a WAN networking environment, the computer system 1400 typically includes a broadband modem 1498, network gateway, or other means for establishing communications over the wide area network 1495, such as the Internet. The broadband modem 1498, which may be internal or external, is connected to the system bus 1414 via a serial port interface 1471. In a networked environment, program modules related to the computer system 1400, or portions thereof, may be stored in the remote memory storage device 1490. It is noted that the network connections shown in FIG. 14 are illustrative and other means of establishing a communications link between the computers may be used depending on the specific requirements of an application of the present geo-replicated IoT hub.

Figure 15:
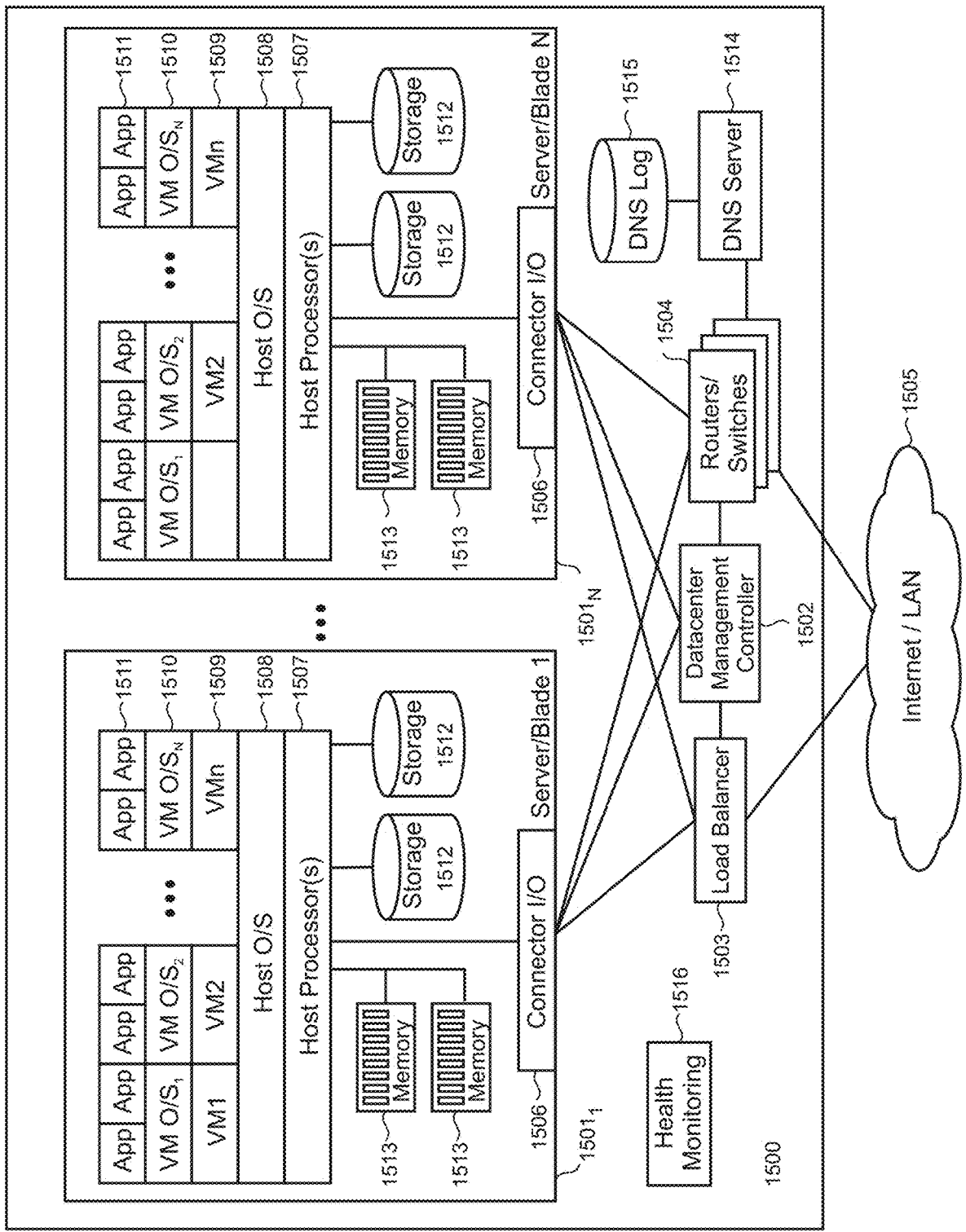
FIG. 15 is a block diagram of an illustrative datacenter that may be used at least in part to implement the present geo-replicated IoT hub.

FIG. 15 is a high-level block diagram of an illustrative datacenter 1500 that provides cloud computing services or distributed computing services that may be used to implement the present geo-replicated IoT hub. A plurality of servers 1501 are managed by datacenter management controller 1502. Load balancer 1503 distributes requests and computing workloads over servers 1501 to avoid a situation wherein a single server may become overwhelmed. Load balancer 1503 maximizes available capacity and performance of the resources in datacenter 1500. Routers/switches 1504 support data traffic between servers 1501 and between datacenter 1500 and external resources and users (not shown) via an external network 1505, which may be, for example, a local area network (LAN) or the Internet.

Servers 1501 may be standalone computing devices, and/or they may be configured as individual blades in a rack of one or more server devices. Servers 1501 have an input/output (I/O) connector 1506 that manages communication with other database entities. One or more host processors 1507 on each server 1501 run a host operating system (O/S) 1508 that supports multiple virtual machines (VM) 1509. Each VM 1509 may run its own O/S so that each VM O/S 1510 on a server is different, or the same, or a mix of both. The VM O/Ss 1510 may be, for example, different versions of the same O/S (e.g., different VMs running different current and legacy versions of the Windows® operating system). In addition, or alternatively, the VM O/Ss 1510 may be provided by different manufacturers (e.g., some VMs running the Windows® operating system, while other VMs are running the Linux® operating system). Each VM 1509 may also run one or more applications (Apps) 1511. Each server 1501 also includes storage 1512 (e.g., hard disk drives (HDD)) and memory 1513 (e.g., RAM) that can be accessed and used by the host processors 1507 and VMs 1509 for storing software code, data, etc. In one embodiment, a VM 1509 may employ the data plane APIs as disclosed herein.

Datacenter 1500 provides pooled resources on which customers can dynamically provision and scale applications as needed without having to add servers or additional networking. This allows customers to obtain the computing resources they need without having to procure, provision, and manage infrastructure on a per-application, ad-hoc basis. A cloud computing datacenter 1500 allows customers to scale up or scale down resources dynamically to meet the current needs of their business. Additionally, a datacenter operator can provide usage-based services to customers so that they pay for only the resources they use, when they need to use them. For example, a customer may initially use one VM 1509 on server $1501_1$ to run their applications 1511. When demand for an application 1511 increases, the datacenter 1500 may activate additional VMs 1509 on the same server $1501_1$ and/or on a new server $1501_N$ as needed. These additional VMs 1509 can be deactivated if demand for the application later drops.

Datacenter 1500 may offer guaranteed availability, disaster recovery, and back-up services. For example, the datacenter may designate one VM 1509 on server $1501_1$ as the primary location for the customer's application and may activate a second VM 1509 on the same or different server as a standby or back-up in case the first VM or server $1501_1$ fails. Datacenter management controller 1502 automatically shifts incoming user requests from the primary VM to the back-up VM without requiring customer intervention. Although datacenter 1500 is illustrated as a single location, it will be understood that servers 1501 may be distributed to multiple locations across the globe to provide additional redundancy and disaster recovery capabilities. Additionally, datacenter 1500 may be an on-premises, private system that provides services to a single enterprise user or may be a publicly accessible, distributed system that provides services to multiple, unrelated customers or may be a combination of both.

Domain Name System (DNS) server 1514 resolves domain and host names into IP (Internet Protocol) addresses for all roles, applications, and services in datacenter 1500. DNS log 1515 maintains a record of which domain names have been resolved by role. It will be understood that DNS is used herein as an example and that other name resolution services and domain name logging services may be used to identify dependencies.

Datacenter health monitoring 1516 monitors the health of the physical systems, software, and environment in datacenter 1500. Health monitoring 1516 provides feedback to datacenter managers when problems are detected with servers, blades, processors, or applications in datacenter 1500 or when network bandwidth or communications issues arise.

Various exemplary embodiments of the present geo-replicated IoT hub are now presented by way of illustration and not as an exhaustive list of all embodiments. An example includes a method performed by a target Internet of Things (IoT) hub in a plurality of geo-replicated IoT hubs to maintain telemetry data redundancy for IoT devices across the plurality of geo-replicated IoT hubs, in which the target geo-replicated IoT hub and each of the plurality of geo-replicated IoT hubs are comprised of servers to communicate with IoT devices, comprising: receiving telemetry data associated with an IoT device from a first geo-replicated IoT hub, in which the first geo-replicated IoT hub is connected to and communicates with the IoT device to receive the telemetry data; receiving a request from the IoT device to establish a network connection for communicating telemetry data from the IoT device to the target geo-replicated IoT hub; responsive to the received request, transmitting a proposal to each available geo-replicated IoT hub to receive ownership over the IoT device, ownership being that the IoT device transmits telemetry data to the target geo-replicated IoT hub and the target geo-replicated IoT hub transmits commands or data to the IoT device; and taking ownership over the IoT device upon receiving confirmation from one or more of the available geo-replicated IoT hubs and a quorum being established among the plurality of geo-replicated IoT hubs for the target geo-replicated IoT hub to take ownership over the IoT device.

In another example, the request to establish the network connection from the IoT device is received while the first geo-replicated IoT hub still owns the IoT device and is capable of sending commands and data to the IoT device. In another example, the target geo-replicated IoT hub and the plurality of geo-replicated IoT hubs are each assigned a defined geographical region, by which geo-replicated IoT hubs are assigned ownership over IoT devices based on which defined geographical region the IoT device is located. In another example, telemetry data from the IoT device are transmitted to the target geo-replicated IoT hub upon establishing the quorum. In that example, a version value for the IoT device is maintained by each geo-replicated IoT hub which indicates ownership over the IoT device by a specific geo-replicated IoT hub, and wherein the proposal to receive ownership over the IoT device transmitted to each available geo-replicated IoT hub includes transmitting an updated version value that is used to verify new ownership over the IoT device. In yet another example, the updated version value is an incremented number which contains a value higher than a previous version value maintained across the geo-replicated IoT hubs. As another example, the request to establish the network connection from the IoT device is initiated on a client computing device by an operator of the IoT device.

A further example includes one or more hardware-based non-transitory computer-readable memory devices storing instructions which, when executed by one or more processors disposed in an Internet of Things (IoT) device, cause the IoT device to: utilize a network connection with a first geo-replicated IoT hub of a plurality of geo-replicated IoT hubs, over which the IoT device transmits telemetry data; responsive to an event, send a request to a target geo-replicated IoT hub of the plurality of geo-replicated IoT hubs to establish a network connection and transmit the telemetry data; and establish and maintain the network connection with the target geo-replicated IoT hub in response to receiving a confirmation for ownership over the IoT device from the target geo-replicated IoT hub, wherein the IoT device establishes and maintains the network connection to the target geo-replicated IoT hub when a quorum is present among each of the plurality of geo-replicated IoT hubs, which indicates that the target geo-replicated IoT hub is an owner over the IoT device, the owner of the IoT device being responsible for receiving D2C (device-to-cloud) messages from the IoT device and sending C2D (cloud-to-device) messages to the IoT device.

In another example, the event includes location data indicating that the IoT device is present in a region of the target geo-replicated IoT hub, or the geo-replicated IoT hub is experiencing one or more of technical failures, storage failures, or infrastructure deficiencies. In another example, an owner or operator of the IoT device initiates the request for the target geo-replicated IoT hub to establish the network connection with the IoT device. In another example, the target geo-replicated IoT hub either synchronously or asynchronously replicates the telemetry data for the IoT device across each of the plurality of geo-replicated IoT hubs. As another example, an owner or operator of the IoT device selects synchronous or asynchronous data replication using a client computing device configured with control over the IoT device. In another example, the IoT device utilizes stateless services provided by the first geo-replicated IoT hub to communicate with the target geo-replicated IoT hub, wherein the stateless services include at least networking functionality. In another example, the executed instructions further cause the IoT device to: receive an indication that establishing and maintaining the network connection with the target geo-replicated IoT hub will result in data loss from the first geo-replicated IoT hub; and transmit permission to establish the network connection or cancel the network connection with the target geo-replicated IoT hub.

A further example, includes a target Internet of Things (IoT) hub in a plurality of geo-replicated IoT hubs each configured with one or more servers, the target geo-replicated IoT hub being associated with a first region inside a defined geographical area, comprising: one or more processors; and one or more hardware-based memory devices storing computer-readable instructions which, when executed by the one or more processors cause the target geo-replicated IoT hub to: receive a request to establish a network connection between the target geo-replicated IoT hub and an IoT device, in which the network connection is used to communicate data and commands between the IoT device and the target geo-replicated IoT hub; transmit a request for permission to available geo-replicated IoT hubs for ownership over the IoT device responsive to the received request, in which ownership indicates that the target geo-replicated IoT hub is responsible for communicating the data and commands with the IoT device; receive, from one or more of the available geo-replicated IoT hubs, confirmation to take ownership over and establish the network connection with the IoT device, such that the confirmation is a confirmatory quorum among the geo-replicated IoT hubs; and establish the network connection with and take ownership over the IoT device upon receiving the confirmation.

In another example, the received request to establish the network connection with the target geo-replicated IoT hub is from the IoT device and is due to one or more of user-initiated maintenance on a previously used geo-replicated IoT hub, or connectivity problems, technical failures, storage failures, or infrastructure deficiencies with the previously used geo-replicated IoT hub. In another example, the infrastructure deficiencies include technical incapability of the previously used geo-replicated IoT hub, of which the target geo-replicated IoT hub is configured to handle. As another example, a region for a respective target or geo-replicated IoT hub is decided by one or more boundary lines or perimeters and can extend across continents or countries. In another example, while connected with the IoT device, a previously used geo-replicated IoT hub asynchronously replicates telemetry data for the IoT device with each of the plurality of geo-replicated IoT hubs, and the executed instructions further cause the target geo-replicated IoT hub to: responsive to receiving confirmation to establish the network connection with the IoT device, check whether the telemetry data at the target geo-replicated IoT hub is up-to-date relative to that which is stored on the previously used geo-replicated IoT hub; if the telemetry data is not up-to-date, attempt data recovery of the telemetry data from the previously used geo-replicated IoT hub; if data recovery fails, determine whether to establish the network connection between the target geo-replicated IoT hub and the IoT device; and establish the network connection with the IoT device based on the determination. As another example, the target geo-replicated IoT hub automatically establishes the network connection with the IoT device if the telemetry data is up-to-date or data recovery from the previously used geo-replicated IoT hub is successful.

Although the subject matter has been described in language specific to structural features and/or methodological acts, it is to be understood that the subject matter defined in the appended claims is not necessarily limited to the specific

What is claimed:

1. A method performed by a target Internet of Things (IoT) hub in a plurality of geo-replicated IoT hubs to maintain telemetry data redundancy for IoT devices across the plurality of geo-replicated IoT hubs, in which the target geo-replicated IoT hub and each of the plurality of geo-replicated IoT hubs are comprised of servers to communicate with IoT devices, comprising:

receiving telemetry data associated with an IoT device from a first geo-replicated IoT hub, in which the first geo-replicated IoT hub is connected to and communicates with the IoT device to receive the telemetry data;

receiving a request from the IoT device to establish a network connection for communicating telemetry data from the IoT device to the target geo-replicated IoT hub;

responsive to the received request, transmitting a proposal to each available geo-replicated IoT hub to receive ownership over the IoT device, ownership being that the IoT device transmits telemetry data to the target geo-replicated IoT hub and the target geo-replicated IoT hub transmits commands or data to the IoT device; and taking ownership over the IoT device upon receiving confirmation from one or more of the available geo-replicated IoT hubs and a quorum being established among the plurality of geo-replicated IoT hubs for the target geo-replicated IoT hub to take ownership over the IoT device.

2. The method of claim 1, in which the request to establish the network connection from the IoT device is received while the first geo-replicated IoT hub still owns the IoT device and is capable of sending commands and data to the IoT device.

3. The method of claim 1, in which the target geo-replicated IoT hub and the plurality of geo-replicated IoT hubs are each assigned a defined geographical region, by which geo-replicated IoT hubs are assigned ownership over IoT devices based on which defined geographical region the IoT device is located.

4. The method of claim 1, in which telemetry data from the IoT device are transmitted to the target geo-replicated IoT hub upon establishing the quorum.

5. The method of claim 4, in which a version value for the IoT device is maintained by each geo-replicated IoT hub which indicates ownership over the IoT device by a specific geo-replicated IoT hub, and wherein the proposal to receive ownership over the IoT device transmitted to each available geo-replicated IoT hub includes transmitting an updated version value that is used to verify new ownership over the IoT device.

6. The method of claim 5, in which the updated version value is an incremented number which contains a value higher than a previous version value maintained across the geo-replicated IoT hubs.

7. The method of claim 1, in which the request to establish the network connection from the IoT device is initiated on a client computing device by a user who has control over the IoT device.

8. One or more hardware-based non-transitory computer-readable memory devices storing instructions which, when executed by one or more processors disposed in an Internet of Things (IoT) device, cause the IoT device to:

utilize a network connection with a first geo-replicated IoT hub of a plurality of geo-replicated IoT hubs, over which the IoT device transmits telemetry data;

responsive to an event, send a request to a target geo-replicated IoT hub of the plurality of geo-replicated IoT hubs to establish a network connection and transmit the telemetry data; and establish and maintain the network connection with the target geo-replicated IoT hub in response to receiving a confirmation for ownership over the IoT device from the target geo-replicated IoT hub, wherein the IoT device establishes and maintains the network connection to the target geo-replicated IoT hub when a quorum is present among each of the plurality of geo-replicated IoT hubs, which indicates that the target geo-replicated IoT hub is an owner over the IoT device, the owner of the IoT device being responsible for receiving D2C (device-to-cloud) messages from the IoT device and sending C2D (cloud-to-device) messages to the IoT device.

9. The one or more hardware-based non-transitory computer-readable memory devices of claim 8, in which the event includes location data indicating that the IoT device is present in a region of the target geo-replicated IoT hub, or the geo-replicated IoT hub is experiencing one or more of technical failures, storage failures, or infrastructure deficiencies.

10. The one or more hardware-based non-transitory computer-readable memory devices of claim 9, in which an owner or operator of the IoT device initiates the request for the target geo-replicated IoT hub to establish the network connection with the IoT device.

11. The one or more hardware-based non-transitory computer-readable memory devices of claim 8, in which the target geo-replicated IoT hub either synchronously or asynchronously replicates the telemetry data for the IoT device across each of the plurality of geo-replicated IoT hubs.

12. The one or more hardware-based non-transitory computer-readable memory devices of claim 11, in which an owner or operator of the IoT device selects synchronous or asynchronous data replication using a client computing device configured with control over the IoT device.

13. The one or more hardware-based non-transitory computer-readable memory devices of claim 8, in which the IoT device utilizes stateless services provided by the first geo-replicated IoT hub to communicate with the target geo-replicated IoT hub, wherein the stateless services include at least networking functionality.

14. The one or more hardware-based non-transitory computer-readable memory devices of claim 8, in which the executed instructions further cause the IoT device to:

receive an indication that establishing and maintaining the network connection with the target geo-replicated IoT hub will result in data loss from the first geo-replicated IoT hub; and transmit permission to establish the network connection or cancel the network connection with the target geo-replicated IoT hub.

15. A target Internet of Things (IoT) hub in a plurality of geo-replicated IoT hubs each configured with one or more servers, the target geo-replicated IoT hub being associated with a first region inside a defined geographical area, comprising:

one or more processors; and one or more hardware-based memory devices storing computer-readable instructions which, when executed by the one or more processors cause the target geo-replicated IoT hub to:

receive a request to establish a network connection between the target geo-replicated IoT hub and an IoT device, in which the network connection is used to communicate data and commands between the IoT device and the target geo-replicated IoT hub;

transmit a request for permission to available geo-replicated IoT hubs for ownership over the IoT device responsive to the received request, in which ownership indicates that the target geo-replicated IoT hub is responsible for communicating the data and commands with the IoT device;

receive, from one or more of the available geo-replicated IoT hubs, confirmation to take ownership over and establish the network connection with the IoT device, such that the confirmation is a confirmatory quorum among the geo-replicated IoT hubs; and establish the network connection with and take ownership over the IoT device upon receiving the confirmation.

16. The target geo-replicated IoT hub of claim 15, in which the received request to establish the network connection with the target geo-replicated IoT hub is from the IoT device and is due to one or more of user-initiated maintenance on a previously used geo-replicated IoT hub, or connectivity problems, technical failures, storage failures, or infrastructure deficiencies with the previously used geo-replicated IoT hub.

17. The target geo-replicated IoT hub of claim 16, in which the infrastructure deficiencies include technical incapability of the previously used geo-replicated IoT hub, of which the target geo-replicated IoT hub is configured to handle.

18. The target geo-replicated IoT hub of claim 15, in which a region for a respective target or geo-replicated IoT hub is decided by one or more boundary lines or perimeters and can extend across continents or countries.

19. The target geo-replicated IoT hub of claim 15, in which, while connected with the IoT device, a previously used geo-replicated IoT hub asynchronously replicates telemetry data for the IoT device with each of the plurality of geo-replicated IoT hubs, and the executed instructions further cause the target geo-replicated IoT hub to:

responsive to receiving confirmation to establish the network connection with the IoT device, check whether the telemetry data at the target geo-replicated IoT hub is up-to-date relative to that which is stored on the previously used geo-replicated IoT hub;

if the telemetry data is not up-to-date, attempt data recovery of the telemetry data from the previously used geo-replicated IoT hub;

if data recovery fails, determine whether to establish the network connection between the target geo-replicated IoT hub and the IoT device; and establish the network connection with the IoT device based on the determination.

20. The target geo-replicated IoT hub of claim 19, in which the target geo-replicated IoT hub automatically establishes the network connection with the IoT device if the telemetry data is up-to-date or data recovery from the previously used geo-replicated IoT hub is successful.

* * * * *